US011773923B2

(12) United States Patent
Ozawa et al.

(10) Patent No.: US 11,773,923 B2
(45) Date of Patent: Oct. 3, 2023

(54) POWER TRANSMISSION APPARATUS

(71) Applicant: Kabushiki Kaisha F.C.C., Hamamatsu (JP)

(72) Inventors: Yoshihiko Ozawa, Hamamatsu (JP); Han Hiong Chen, Hamamatsu (JP); Katsu Yoshimoto, Hamamatsu (JP)

(73) Assignee: KABUSHIKI KAISHA F.C.C., Shizuoka (JP)

( * ) Notice: Subject to any disclaimer, the term of this patent is extended or adjusted under 35 U.S.C. 154(b) by 0 days.

(21) Appl. No.: 17/918,404

(22) PCT Filed: Sep. 14, 2020

(86) PCT No.: PCT/JP2020/034741
§ 371 (c)(1),
(2) Date: Oct. 12, 2022

(87) PCT Pub. No.: WO2021/210196
PCT Pub. Date: Oct. 21, 2021

(65) Prior Publication Data
US 2023/0145318 A1   May 11, 2023

(30) Foreign Application Priority Data

Apr. 13, 2020 (JP) ................................ 2020-071891

(51) Int. Cl.
*F16D 43/12* (2006.01)
*B60K 17/02* (2006.01)
(Continued)

(52) U.S. Cl.
CPC ............. *F16D 43/12* (2013.01); *B60K 17/02* (2013.01); *F16D 13/52* (2013.01); *F16D 47/00* (2013.01);
(Continued)

(58) Field of Classification Search
CPC .......... F15D 13/52; F15D 43/06; F15D 43/08; F15D 43/10; F15D 43/12; F15D 43/216
See application file for complete search history.

(56) References Cited

U.S. PATENT DOCUMENTS 1,766,227 A * 6/1930 Russell .................... F16D 43/10
192/105 B
3,181,673 A * 5/1965 Poliseo ..................... F16D 41/22
192/103 A (Continued)

FOREIGN PATENT DOCUMENTS

DE    963 173 A1    6/1971
FR    989678 A      9/1951

(Continued)

OTHER PUBLICATIONS

English translation of Official Communication issued in International Patent Application No. PCT/JP2020/034741, dated Nov. 17, 2020.

(Continued)

*Primary Examiner* — Stacey A Fluhart
(74) *Attorney, Agent, or Firm* — KEATING AND BENNETT, LLP

(57) ABSTRACT

In a power transmission apparatus, a centrifugal clutch includes a holder, a press, and springs to urge masses from a radially outer position to a radially inner position. The masses are each housed in an associated one of housing portions arranged in a circumferential direction of the holder such that the masses are radially movable. More than one spring is provided in the circumferential direction between an inner peripheral wall surface of each of the housing portions and an associated one of the masses to urge the associated mass from the radially outer position to the radially inner position.

9 Claims, 22 Drawing Sheets

(51) Int. Cl.
*F16D 13/52* (2006.01)
*F16D 47/00* (2006.01)

(52) U.S. Cl.
CPC ...... *F16D 2300/10* (2013.01); *F16D 2300/12* (2013.01)

(56) References Cited

U.S. PATENT DOCUMENTS

| | | | | |
|---|---|---|---|---|
| 5,070,984 | A | * 12/1991 | Fehring | F16D 13/757 192/111.16 |
| 2005/0000775 | A1 | * 1/2005 | Drussel | F16D 43/12 192/105 B |
| 2005/0133337 | A1 | * 6/2005 | AbuSamra | F16D 43/12 192/114 R |
| 2006/0169570 | A1 | 8/2006 | AbuSamra et al. | |
| 2007/0125617 | A1 | 6/2007 | Gochenour | |
| 2015/0337910 | A1 | 11/2015 | Yoshimoto et al. | |

FOREIGN PATENT DOCUMENTS

| | | |
|---|---|---|
| JP | 38-2408 B1 | 3/1963 |
| JP | 39-24108 Y1 | 8/1964 |
| JP | 58-53932 U | 4/1983 |
| JP | 63-22431 U | 2/1988 |
| WO | 2013/183588 A1 | 12/2013 |

OTHER PUBLICATIONS

Official Communication issued in International Patent Application No. PCT/JP2020/034741, dated Nov. 17, 2020.

\* cited by examiner

POWER TRANSMISSION APPARATUS

BACKGROUND OF THE INVENTION

1. Field of the Invention

The present invention relates to a power transmission apparatus that is able to freely transmit a rotational force of an input to an output or cut off the rotational force.

2. Description of the Related Art

Usually, a power transmission apparatus included in a motorcycle freely transmits a driving force of an engine to a transmission and a driving wheel or cuts off the driving force. Such a power transmission apparatus includes an input connected to an engine, an output connected to a transmission and a driving wheel, a clutch member connected to the output, and a pressure member that is able to move close to or away from the clutch member. Bringing the pressure member close to the clutch member presses driving and driven clutch plates against each other so as to transmit power therebetween. Bringing the pressure member away from the clutch member releases a pressing force exerted on the driving and driven clutch plates so as to cut off transmission of the power therebetween.

As disclosed, for example, in WO 2013/183588, a power transmission apparatus known in the art includes a centrifugal clutch means including a weight member that moves from a radially inner position of a groove to a radially outer position thereof with centrifugal force produced by rotation of a clutch housing and is thus able to press driving and driven clutch plates against each other. The power transmission apparatus known in the art is able to apply centrifugal force to the weight member in accordance with the rotation of the clutch housing caused by driving of an engine and is thus able to press the driving and driven clutch plates against each other so as to transmit a driving force of the engine to a wheel.

SUMMARY OF THE INVENTION

Unfortunately, the weight member of the power transmission apparatus known in the art is made of a steel ball, which may require a space for movement of a relatively large steel ball, resulting in an increase in the size of the apparatus. The applicant of this application thus has conducted extensive studies on reducing the size of the apparatus by using a substantially symmetrical polygonal weight member including a front side and a rear side. To return the weight member to its initial position, the studies suggest an approach involving providing an urging member, such as a spring.

Upon decrease of centrifugal force produced by rotation of the clutch housing, this approach enables, with the urging member, the weight member to move smoothly from the radially outer position to the radially inner position. Providing a plurality of weight members in a circumferential direction of a holding member such that the weight members are movable radially, however, disadvantageously makes it difficult for the urging means to accurately urge each weight member from the radially outer position to the radially inner position.

Preferred embodiments of the present invention provide power transmission apparatuses that are each able to accurately urge each mass from a radially outer position to a radially inner position and to move each mass in a stable manner in accordance with centrifugal force.

A power transmission apparatus according to a preferred embodiment of the present invention includes a clutch housing that rotates together with an input that rotates due to a driving force of an engine of a vehicle, the clutch housing having a plurality of driving clutch plates attached thereto, a clutch having a plurality of driven clutch plates attached thereto, the driven clutch plates being arranged alternately with the driving clutch plates attached to the clutch housing, the clutch being connected to an output that is able to rotate a wheel of the vehicle, a pressure applicator movable between an operating position where the driving and driven clutch plates are pressed against each other so as to enable transmission of the driving force of the engine to the wheel and a non-operating position where a pressing force exerted on the driving and driven clutch plates is released so as to cut off transmission of the driving force of the engine to the wheel, and a centrifugal clutch including masses each movable from a radially inner position to a radially outer position with centrifugal force produced by rotation of the clutch housing, the centrifugal clutch being configured to, when the masses are each located at the radially outer position, press the driving and driven clutch plates against each other so as to enable transmission of the driving force of the engine to the wheel and configured to, when the masses are each located at the radially inner position, release the pressing force exerted on the driving and driven clutch plates so as to cut off transmission of the driving force of the engine to the wheel. The centrifugal clutch includes a holder holding the masses such that the masses are each movable between the radially inner position and the radially outer position, a press to press the driving and driven clutch plates against each other by moving in a stacking direction of the driving and driven clutch plates in response to movement of the masses from the radially inner position to the radially outer position, and springs to urge the masses from the radially outer position to the radially inner position. The masses are each housed in an associated one of housing portions arranged in a circumferential direction of the holder such that the masses are movable radially. More than one of the springs is positioned in the circumferential direction between an inner peripheral wall surface of each of the housing portions and an associated one of the masses.

The masses may be provided with insertion portions (apertures) which are openings defined in surfaces of the masses facing the holder and into which the springs are inserted such that the springs are attachable to the masses.

The masses each may be provided with a groove extending in a direction from the radially inner position to the radially outer position, and the holder is provided with holding portions each conforming to an associated one of the grooves and holding an associated one of the masses.

The centrifugal clutch includes first spherical bodies that are partially protruded from first openings of through holes defined in the masses and are in contact with a rolling contact surface of the press so as to be rollable thereon, and second spherical bodies that are partially protruded from second openings of the through holes defined in the masses and are in contact with a rolling contact surface of the holder so as to be rollable thereon.

The holder or the press includes a groove geometry extending in a direction of movement of the masses, and the groove geometry defines a rolling contact surface for the first spherical bodies or the second spherical bodies.

The first spherical bodies are arranged in the circumferential direction of the holder, and the second spherical bodies are arranged in the circumferential direction of the holder.

According to a preferred embodiment of the present invention, the masses are each housed in an associated one of the housing portions arranged in the circumferential direction of the holder such that the masses are movable radially. More than one spring is positioned in the circumferential direction between the inner peripheral wall surface of each of the housing portions and an associated one of the masses. Consequently, this preferred embodiment is able to accurately urge each mass from the radially outer position to the radially inner position, enabling stable movement of the masses in accordance with centrifugal force.

According to another preferred embodiment of the present invention, the masses are provided with the insertion portions which are openings defined in the surfaces of the masses facing the holder and into which the springs are inserted such that the springs are attachable to the masses. Consequently, this preferred embodiment is able to facilitate assembling the springs to the masses.

According to a further preferred embodiment of the present invention, the masses are each provided with the groove extending in the direction from the radially inner position to the radially outer position. The holder is provided with the holding portions each conforming to the associated groove and holding the associated mass. Consequently, this preferred embodiment enables stable movement of the masses.

According to another preferred embodiment of the present invention, the centrifugal clutch includes the first spherical bodies that are partially protruded from the first openings of the through holes defined in the masses and are in contact with the rolling contact surface of the press so as to be rollable thereon, and the second spherical bodies that are partially protruded from the second openings of the through holes defined in the masses and are in contact with the rolling contact surface of the holder so as to be rollable thereon. Consequently, this preferred embodiment enables more stable movement of the masses.

According to yet another preferred embodiment of the present invention, the holder or the press includes the groove geometry extending in the direction of movement of the masses, and the groove geometry defines the rolling contact surface for the first spherical bodies or the second spherical bodies. Consequently, this preferred embodiment enables smoother movement of the masses.

According to a further preferred embodiment of the present invention, the first spherical bodies are arranged in the circumferential direction of the holder, and the second spherical bodies are arranged in the circumferential direction of the holder. Consequently, this preferred embodiment enables more stable movement of the masses.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 21:
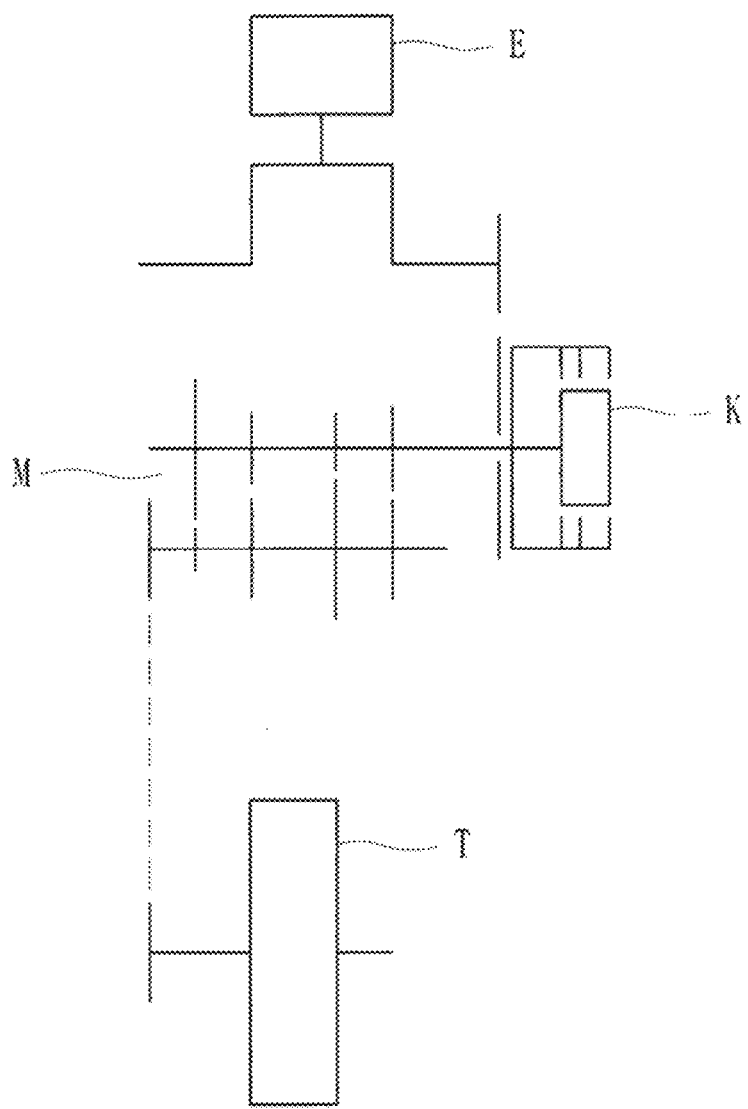
FIG. 21 is a schematic diagram of a vehicle in which the power transmission apparatus is used.

Preferred embodiments of the present invention will be described below in detail with reference to the drawings. As illustrated in FIG. 21, a power transmission apparatus K according to the present preferred embodiment is disposed in a vehicle so as to freely transmit a driving force of an engine E to a driving wheel T through a transmission M or cut off the driving force. As illustrated in FIGS. 1 to 17, the power transmission apparatus K includes a clutch housing 2 provided with an input gear 1 (which is an input) that rotates with the driving force of the engine E of the vehicle, an output shaft 3 (which is an output) connected to the transmission M, a clutch (which includes a first clutch member 4*a* and a second clutch member 4*b*); a pressure member 5

(which is a pressure applicator), a plurality of driving clutch plates 6, a plurality of driven clutch plates 7, a centrifugal clutch 9 including weight members 10 (which are masses), and an auxiliary clutch plate 17.

The input gear 1 is rotatable around the output shaft 3 upon receiving a driving force (or a rotational force) transmitted from the engine E. The input gear 1 is connected to the clutch housing 2 with a fastener, such as a rivet. The clutch housing 2 is a cylindrical member with an opening defined at its right end in FIGS. 2 and 3 and is connected to the input gear 1. The clutch housing 2 is rotatable together with rotation of the input gear 1 with the driving force of the engine E.

Figure 3:
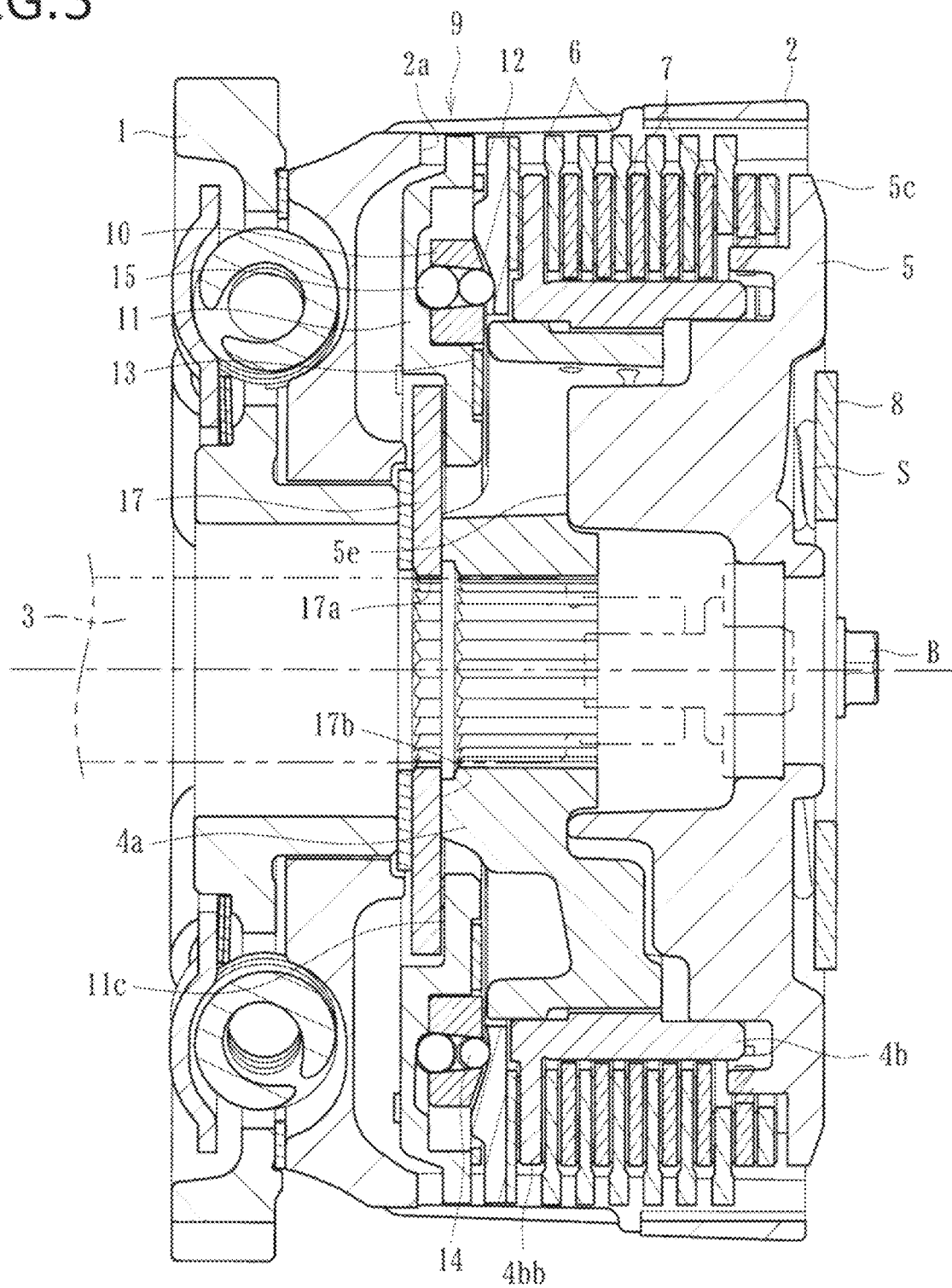
FIG. 3 is a cross-sectional view taken along the line III-III in FIG. 1.
Figure 4:
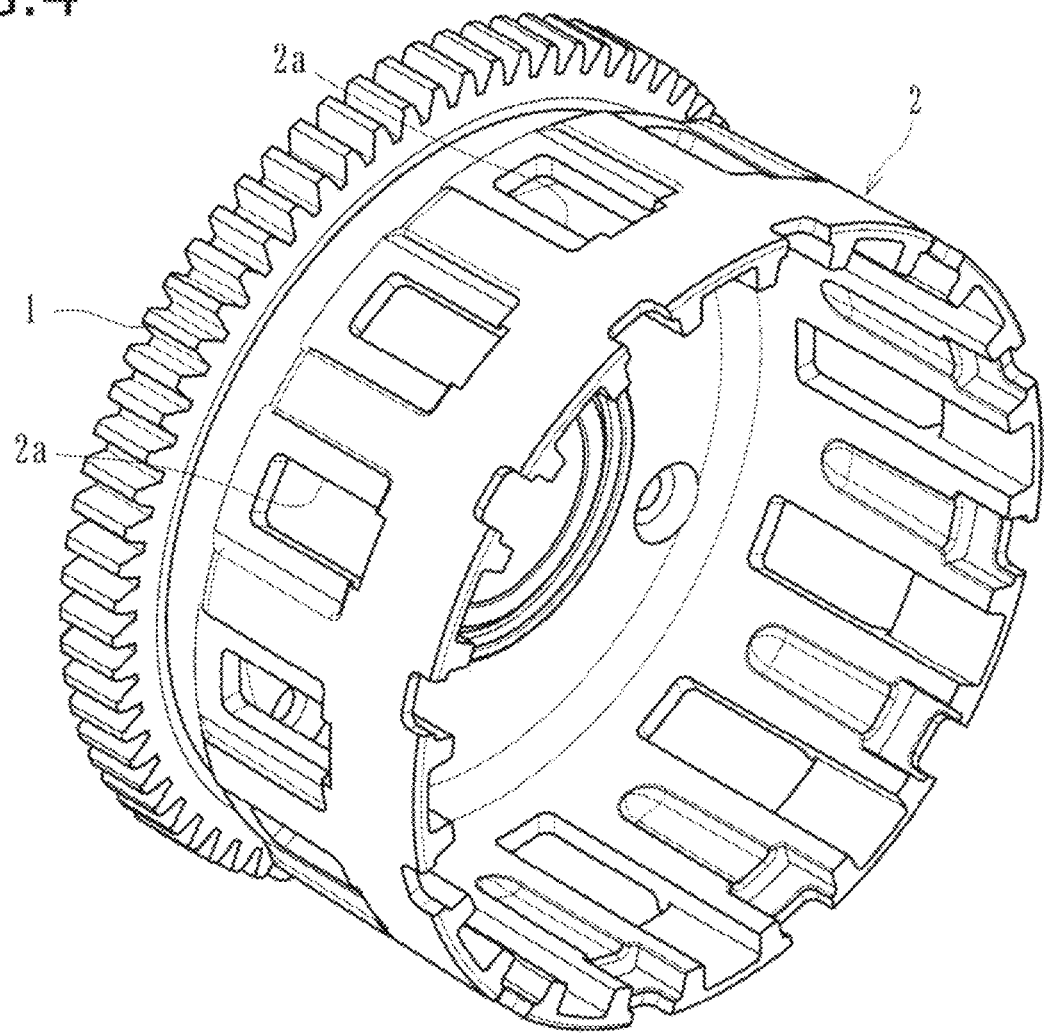
FIG. 4 is a perspective view of a clutch housing of the power transmission apparatus.

As illustrated in FIG. 4, the clutch housing 2 is circumferentially provided with a plurality of cut-outs 2a. The driving clutch plates 6 are fitted to the cut-outs 2A and thus attached to the clutch housing 2. The driving clutch plates 6 are each made of a substantially annular plate material. The driving clutch plates 6 are rotatable together with rotation of the clutch housing 2. The driving clutch plates 6 are slidable in an axial direction (which corresponds to a right-left direction in FIGS. 2 and 3).

The driven clutch plates 7 are attached to the clutch (which includes the first clutch member 4a and the second clutch member 4b). The driven clutch plates 7 are arranged alternately with the driving clutch plates 6 attached to the clutch housing 2. The clutch is connected to the output shaft 3 (i.e., the output) that is able to rotate the driving wheel T through the transmission M of the vehicle. The clutch is provided by assembling two members, i.e., the first clutch member 4a and the second clutch member 4b, to each other.

Figure 5:
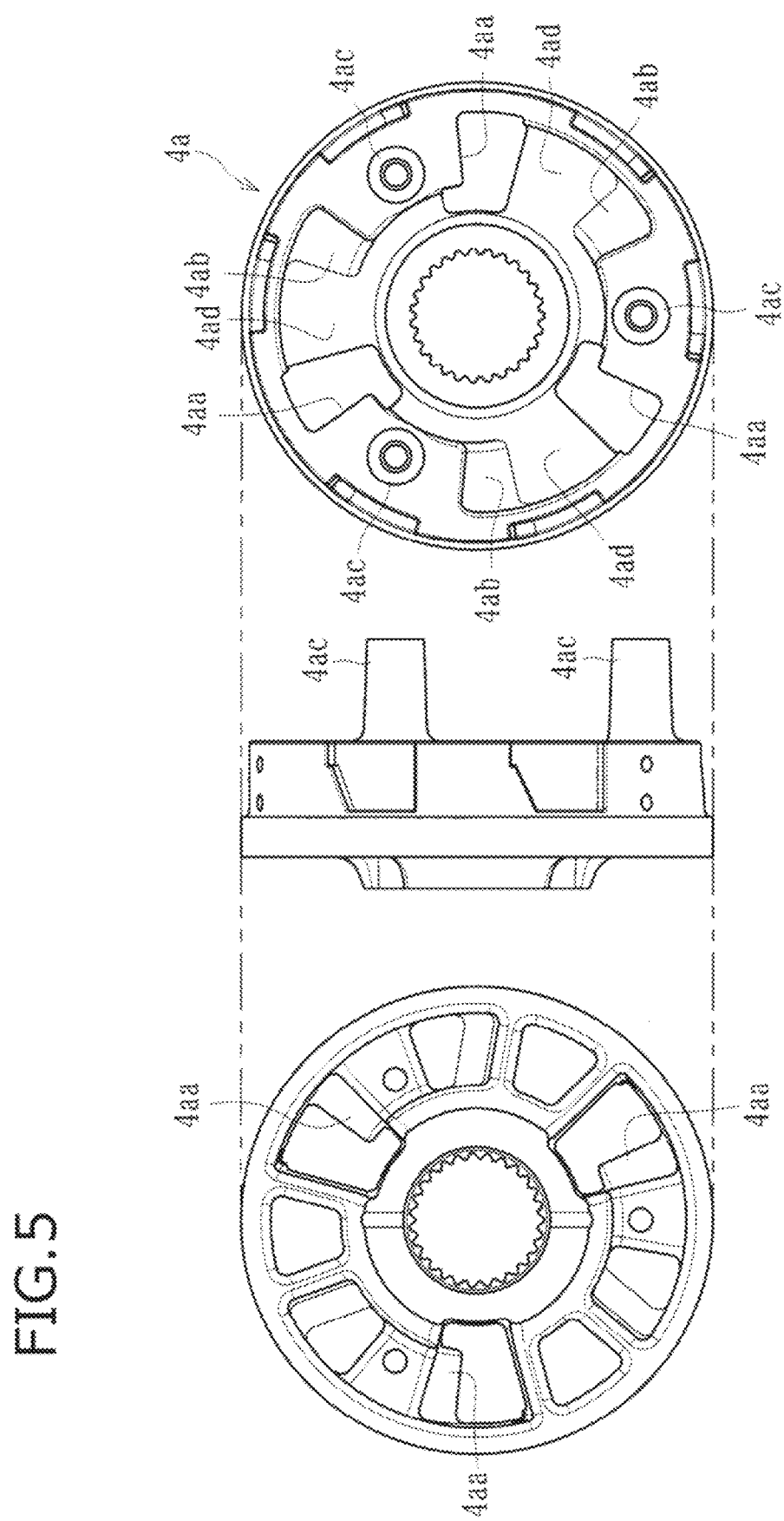
FIG. 5 is a three-view drawing of a first clutch member of the power transmission apparatus.
Figure 6:
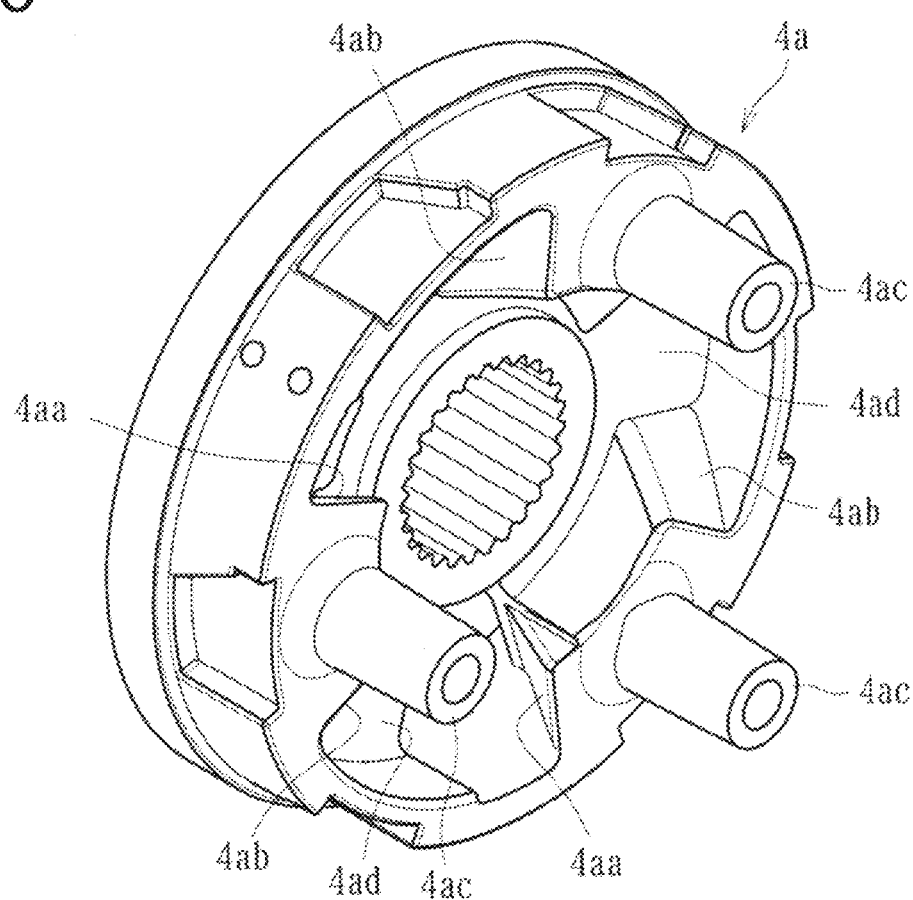
FIG. 6 is a perspective view of the first clutch member.

The output shaft 3 is inserted through an insertion hole (see FIGS. 5 and 6) defined in the center of the first clutch member 4a. A gear provided on the first clutch member 4a and a gear provided on the output shaft 3 mesh with each other so as to be connected to each other in the direction of rotation. As illustrated in FIGS. 5 and 6, the first clutch member 4a is provided with inclined surfaces 4aa each defining a pressing assist cam, and inclined surfaces 4ab each defining a back torque limiter cam. The reference signs "4ac" in FIGS. 5 and 6 each indicate a boss provided with an insertion hole for a bolt B for connection between the first clutch member 4a and a securing member 8.

Figure 1:
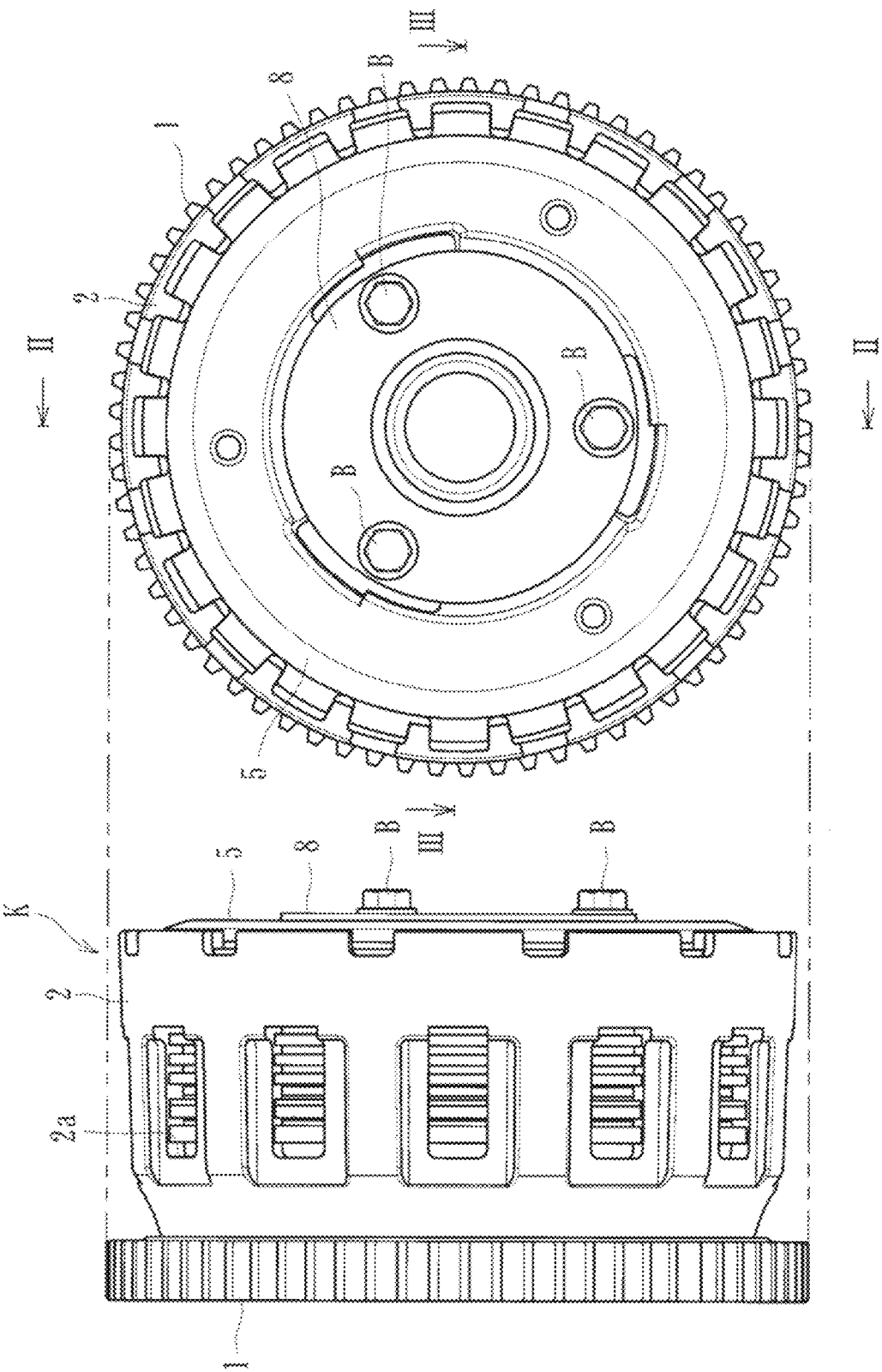
FIG. 1 is an external view of a power transmission apparatus according to a preferred embodiment of the present invention.
Figure 2:
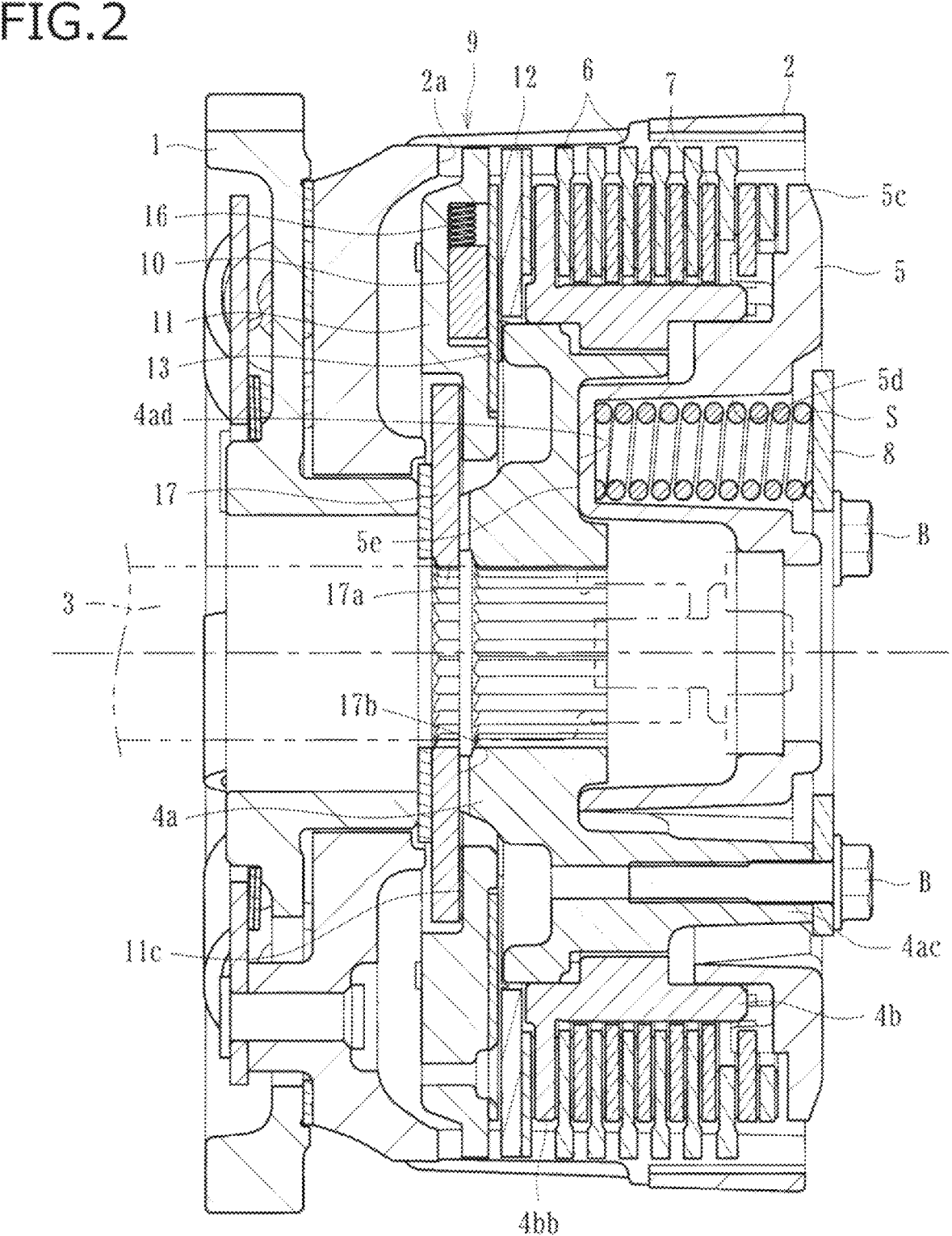
FIG. 2 is a cross-sectional view taken along the line II-II in FIG. 1.
Figure 7:
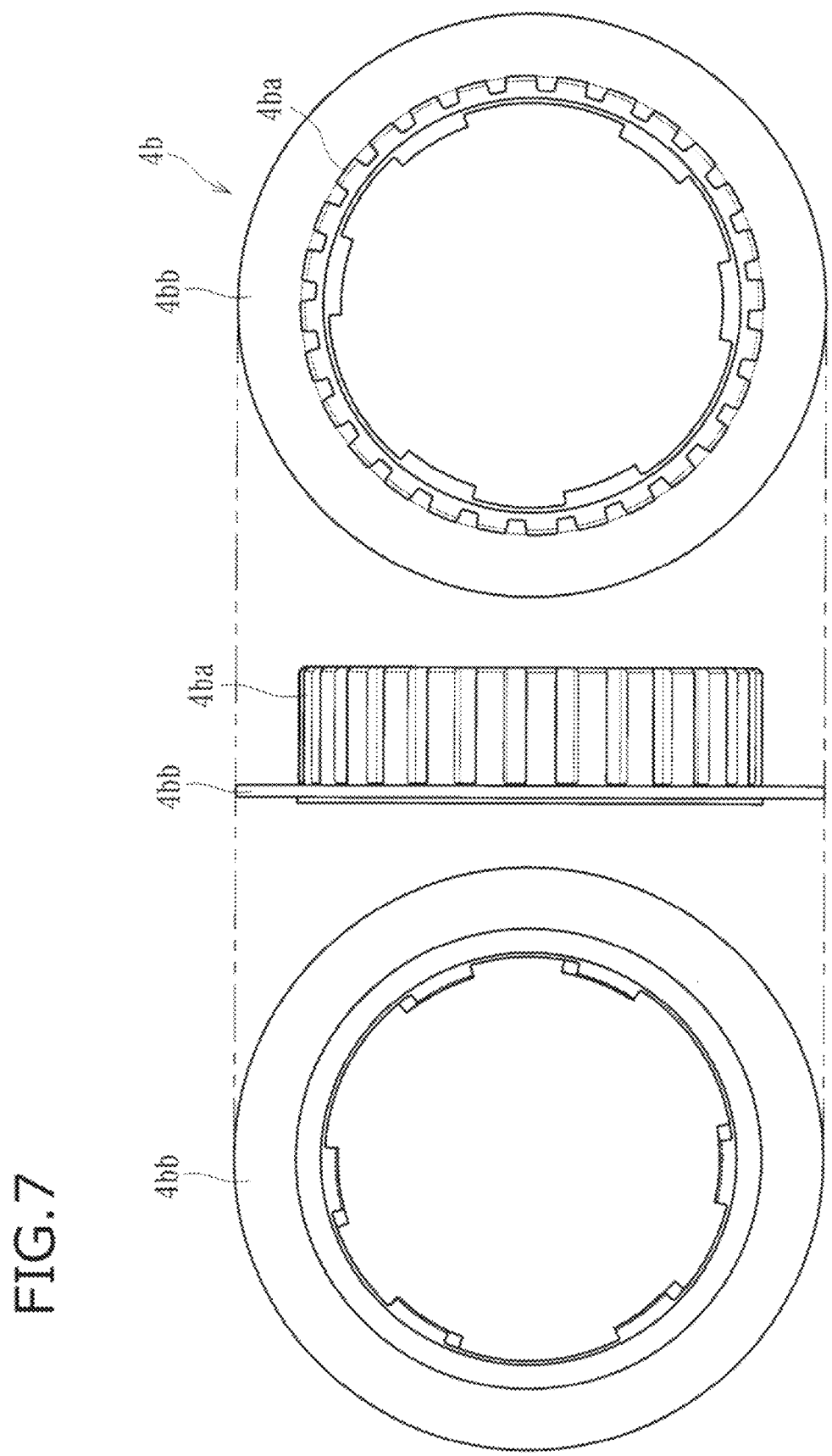
FIG. 7 is a three-view drawing of a second clutch member of the power transmission apparatus.
Figure 8:
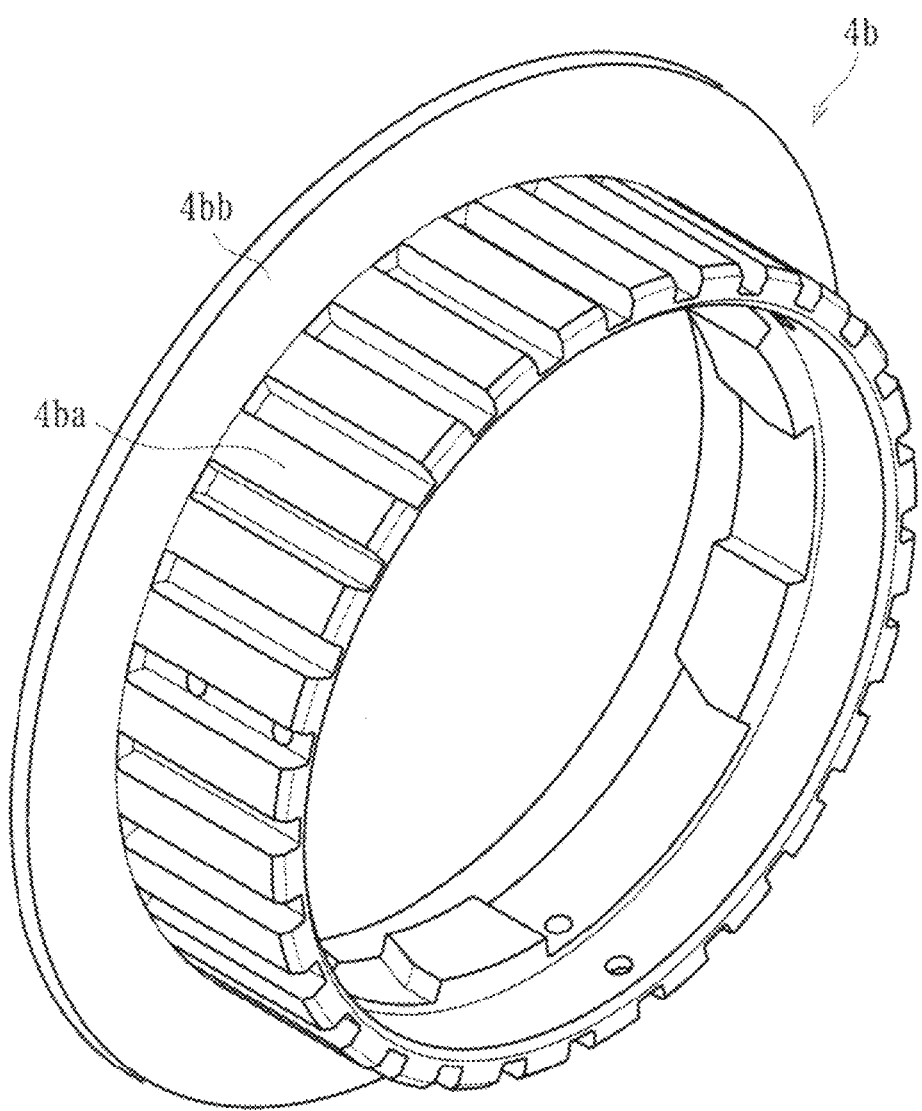
FIG. 8 is a perspective view of the second clutch member.

As illustrated in FIGS. 7 and 8, the second clutch member 4b is an annular member provided with a flange 4bb. The driven clutch plates 7 are spline-fitted to a spline-fitting portion 4ba provided on the outer peripheral surface of the second clutch member 4b and are thus attached to the second clutch member 4b. As illustrated in FIGS. 2 and 3, the pressure member 5 is assembled to the clutch member (which includes the first clutch member 4a and the second clutch member 4b) such that the driving and driven clutch plates 6 and 7 are alternately stacked and secured between a flange 5c of the pressure member 5 and the flange 4bb of the second clutch member 4b.

Figure 9:
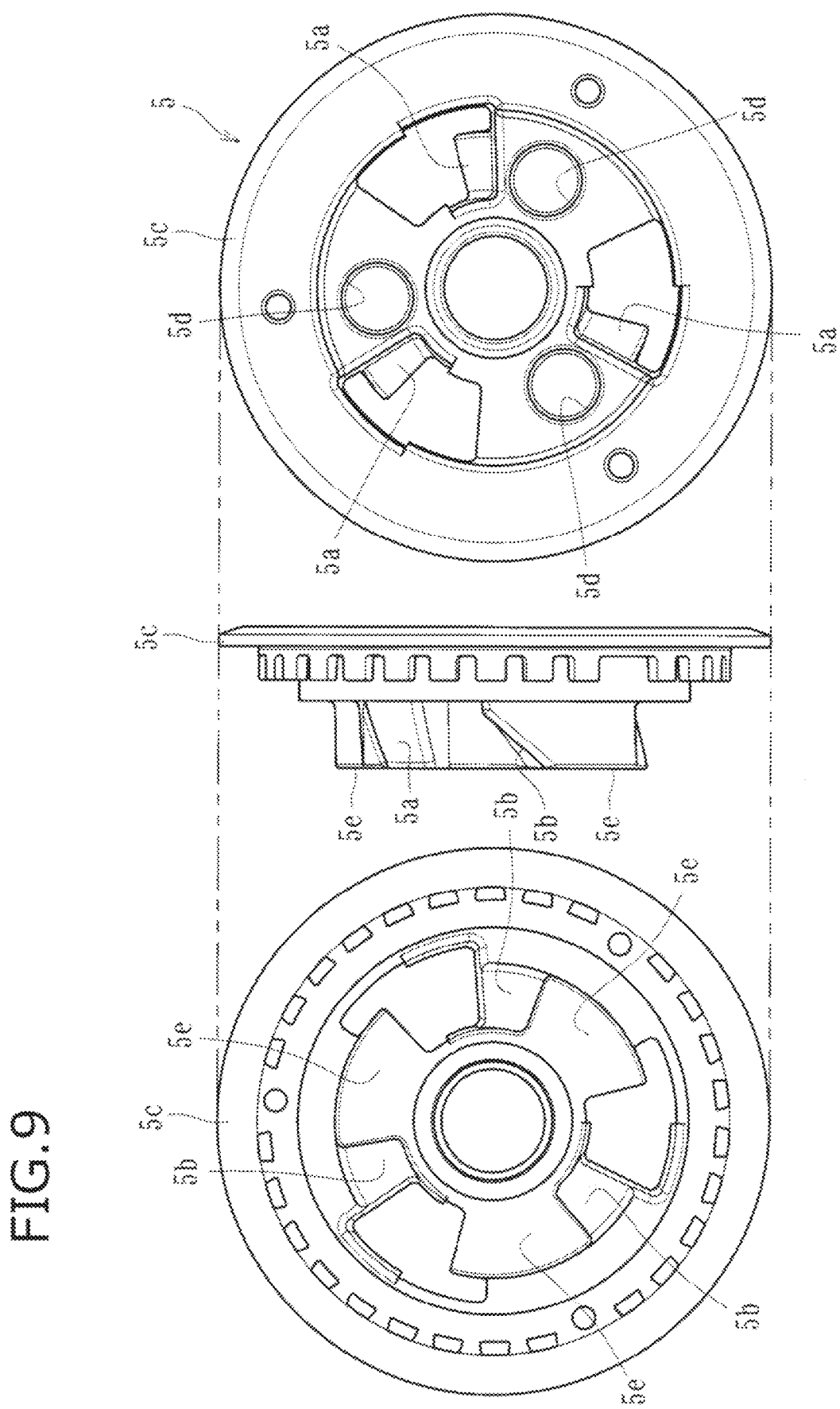
FIG. 9 is a three-view drawing of a pressure member of the power transmission apparatus.
Figure 10:
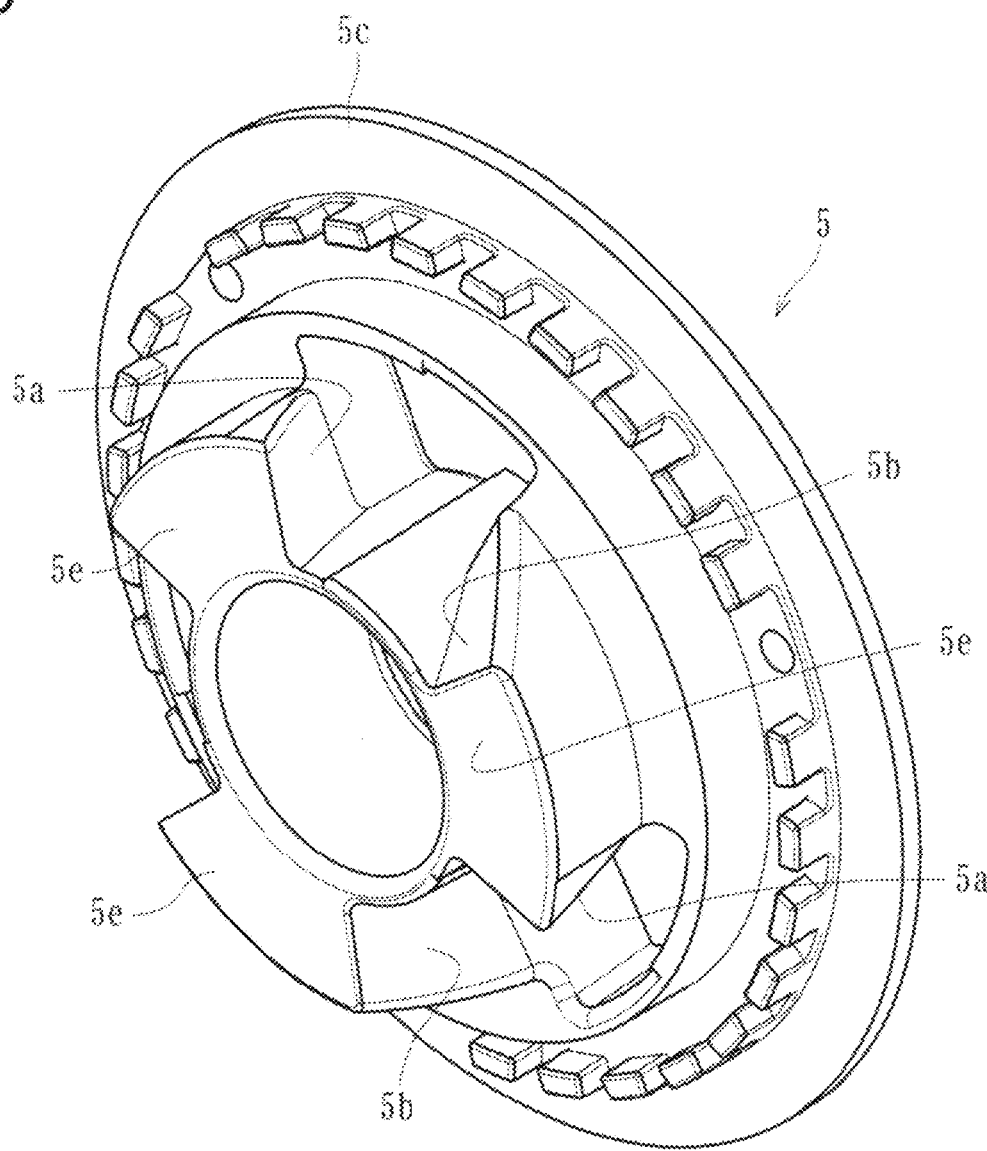
FIG. 10 is a perspective view of the pressure member.

As illustrated in FIGS. 9 and 10, the pressure member 5 is a disk member provided with the flange 5c extending along the peripheral edge of the pressure member 5. The pressure member 5 is movable between an operating position where the driving and driven clutch plates 6 and 7 are pressed against each other so as to enable transmission of the driving force of the engine E to the wheel, and a non-operating position where a pressing force exerted on the driving and driven clutch plates 6 and 7 is released so as to cut off transmission of the driving force of the engine E to the wheel.

More specifically, as illustrated in FIGS. 7 and 8, the spline-fitting portion 4ba provided on the second clutch member 4b defines integral projections and depressions along substantially the entire outer peripheral side surface of the second clutch member 4b. Fitting the driven clutch plates 7 to recessed grooves that define the spline-fitting portion 4ba restricts movement of the driven clutch plates 7 in the direction of rotation while allowing movement of the driven clutch plates 7 in the axial direction relative to the second clutch member 4b. The driven clutch plates 7 are rotatable together with the second clutch member 4b.

The driven clutch plates 7 are stacked alternately with the driving clutch plates 6, making it possible to allow the clutch plates 6 and 7 adjacent to each other to be pressed against each other or release the pressing force exerted thereon. In other words, the clutch plates 6 and 7 are allowed to slide in the axial direction of the second clutch member 4b. Engaging a clutch by pressing the clutch plates (6a, 6b, 7a, 7b) against each other enables a rotational force of the clutch housing 2 to be transmitted to the output shaft 3 through the second clutch member 4b and the first clutch member 4a. Disengaging the clutch by releasing the pressing force exerted on the clutch plates (6a, 6b, 7a, 7b) causes the first clutch member 4a and the second clutch member 4b to stop following the rotation of the clutch housing 2 such that no rotational force will be transmitted to the output shaft 3.

Accordingly, a state where the driving and driven clutch plates 6 and 7 are pressed against each other enables transmission of a rotational force (i.e., the driving force of the engine E), which is received by the clutch housing 2, to the driving wheel (or the transmission M) through the output shaft 3 (i.e., the output), and a state where the driving and driven clutch plates 6 and 7 are not pressed against each other makes it possible to cut off transmission of the rotational force (or the driving force of the engine E), which is received by the clutch housing 2, to the output shaft 3 (i.e., the output).

As illustrated in FIGS. 9 and 10, the pressure member 5 is circumferentially provided with a plurality of fitting holes 5d (i.e., three fitting holes 5d in the present preferred embodiment). A clutch spring S is fitted into each of the fitting holes 5d. As illustrated in FIG. 2, one end of each clutch spring S housed in the associated fitting hole 5d is in abutment with the securing member 8, such that each clutch spring S urges the pressure member 5 in a direction in which the driving and driven clutch plates 6 and 7 are to be pressed against each other. Operating a clutch actuator (not illustrated) makes it possible to press the driving and driven clutch plates 6 and 7 against each other or stop pressing the driving and driven clutch plates 6 and 7 against each other.

In the present preferred embodiment, as illustrated in FIGS. 5, 6, 9, and 10, the first clutch member 4a is provided with the inclined surfaces 4aa and 4ab, and the pressure member 5 is provided with inclined surfaces 5a and 5b respectively facing the inclined surfaces 4aa and 4ab. Specifically, each inclined surface 4aa comes into abutment with the associated inclined surface 5a so as to provide the pressing assist cam, and each inclined surface 4ab comes into abutment with the associated inclined surface 5b so as to provide the back torque limiter cam.

Figure 20A:
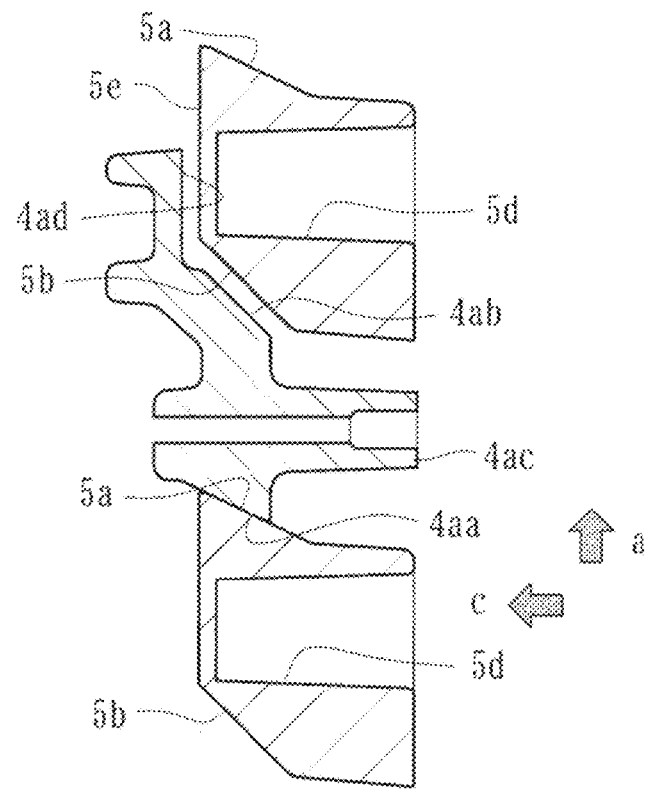
FIG. 20A is a schematic diagram describing how a pressing assist cam of the power transmission apparatus acts.

Suppose that the rotation speed of the engine E is increased and the resulting rotational force received by the input gear 1 and the clutch housing 2 is transmittable to the output shaft 3 through the first clutch member 4a and the second clutch member 4b (which means that the weight members 10 are each located at a radially outer position). In this case, as illustrated in FIG. 20A, the rotational force is applied to the pressure member 5 in an a-direction, which exerts a force on the pressure member 5 in a c-direction in FIG. 20A under the action of each pressing assist cam. The pressure member 5 is thus moved in a direction in which its flange 5c comes closer to the flange 4bb of the second clutch member 4b (i.e., leftward in FIGS. 2 and 3) so as to increase the pressing force exerted on the driving and driven clutch plates 6 and 7.

Figure 20B:
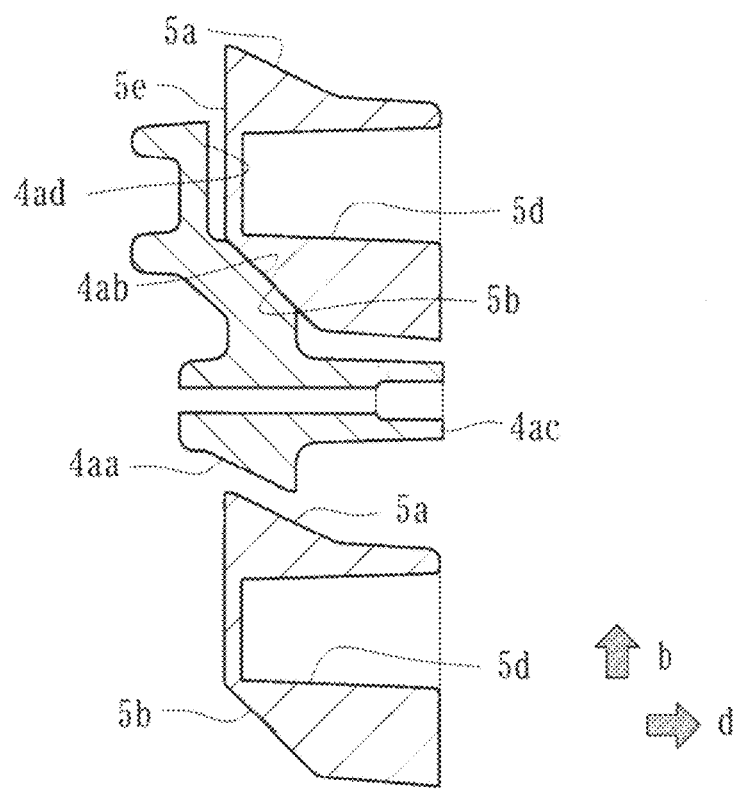
FIG. 20B is a schematic diagram describing how a back torque limiter cam of the power transmission apparatus acts.

Suppose that the rotation of the output shaft 3 exceeds the rotation speed of the input gear 1 and the clutch housing 2, resulting in a back torque. In this case, as illustrated in FIG. 20B, a rotational force is applied to the clutch member 4 in a b-direction, which moves the pressure member 5 in a d-direction in FIG. 20B under the action of each back torque limiter cam so as to release the pressing force exerted on the driving and driven clutch plates 6 and 7. This makes it possible to prevent a malfunction in the power transmission apparatus K or a power source (i.e., the engine E) caused by the back torque.

As illustrated in FIGS. 11 to 19, the centrifugal clutch 9 includes the weight members 10 each movable from a radially inner position (see FIG. 18) to the radially outer position (see FIG. 19) with centrifugal force produced by rotation of the clutch housing 2. When the weight members 10 are each located at the radially outer position, the centrifugal clutch 9 presses the driving and driven clutch plates 6 and 7 against each other so as to enable transmission of the driving force of the engine E to the wheel (i.e., the driving wheel T). When the weight members 10 are each located at the radially inner position, the centrifugal clutch 9 releases the pressing force exerted on the driving and driven clutch plates 6 and 7 so as to cut off transmission of the driving force of the engine E to the wheel (i.e., the driving wheel T).

Specifically, the centrifugal clutch 9 includes the weight members 10, each of which is a substantially symmetrical polygonal member, a holding member 11 (holder) including a supporting member 13 attached thereto, a pressing member 12 (press), first spherical members 14 (first spherical bodies), second spherical members 15 (second spherical bodies), and urging members 16, each of which is a coil spring. The holding member 11 and the pressing member 12 are each circumferentially provided with a plurality of protrusions. Similarly to the driving clutch plates 6, the protrusions are fitted to the cut-outs 2a of the clutch housing 2 such that the holding member 11 and the pressing member 12 are attached to the clutch housing 2. Accordingly, the holding member 11 and the pressing member 12 are each movable in the axial direction of the clutch housing 2 and in engagement with the clutch housing 2 in the direction of rotation so as to be rotatable together with the clutch housing 2.

Figure 16:
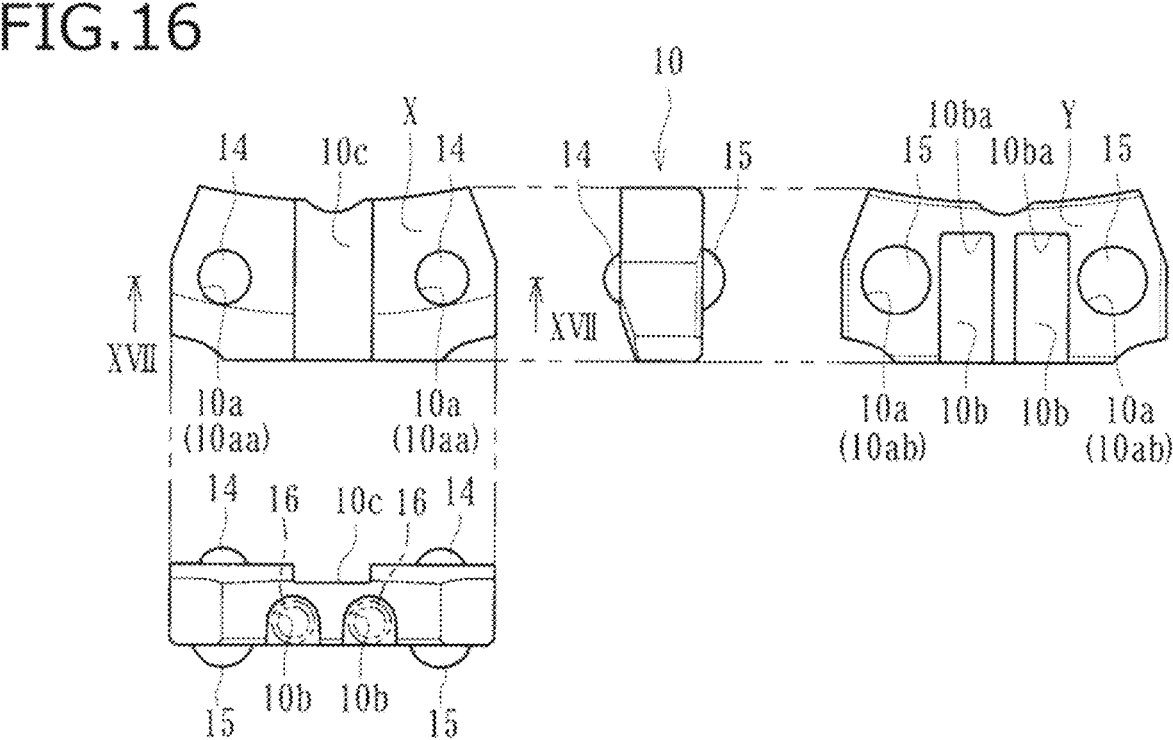
FIG. 16 is a four-view drawing of a weight member included in the centrifugal clutch.
Figure 17:
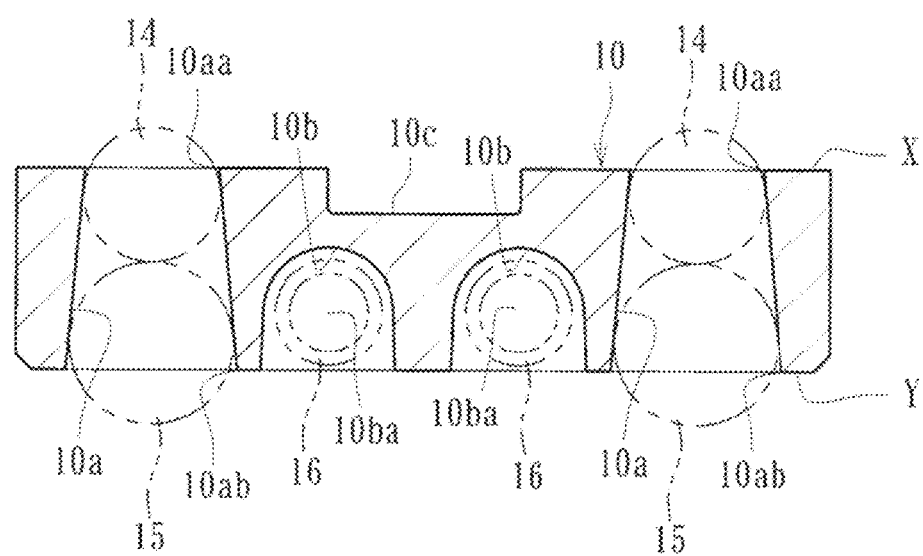
FIG. 17 is a cross-sectional view taken along the line XVII-XVII in FIG. 16.
Figure 18:
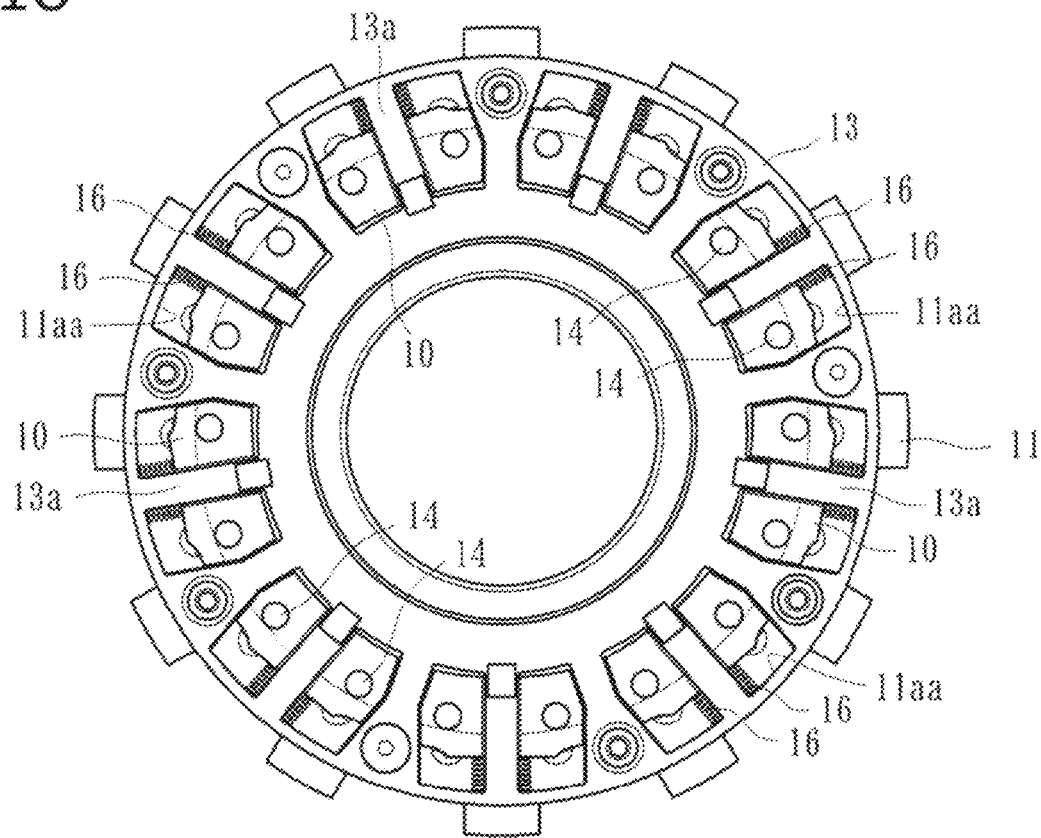
FIG. 18 is a plan view illustrating a state of the centrifugal clutch where each weight member is located at a radially inner position.
Figure 19:
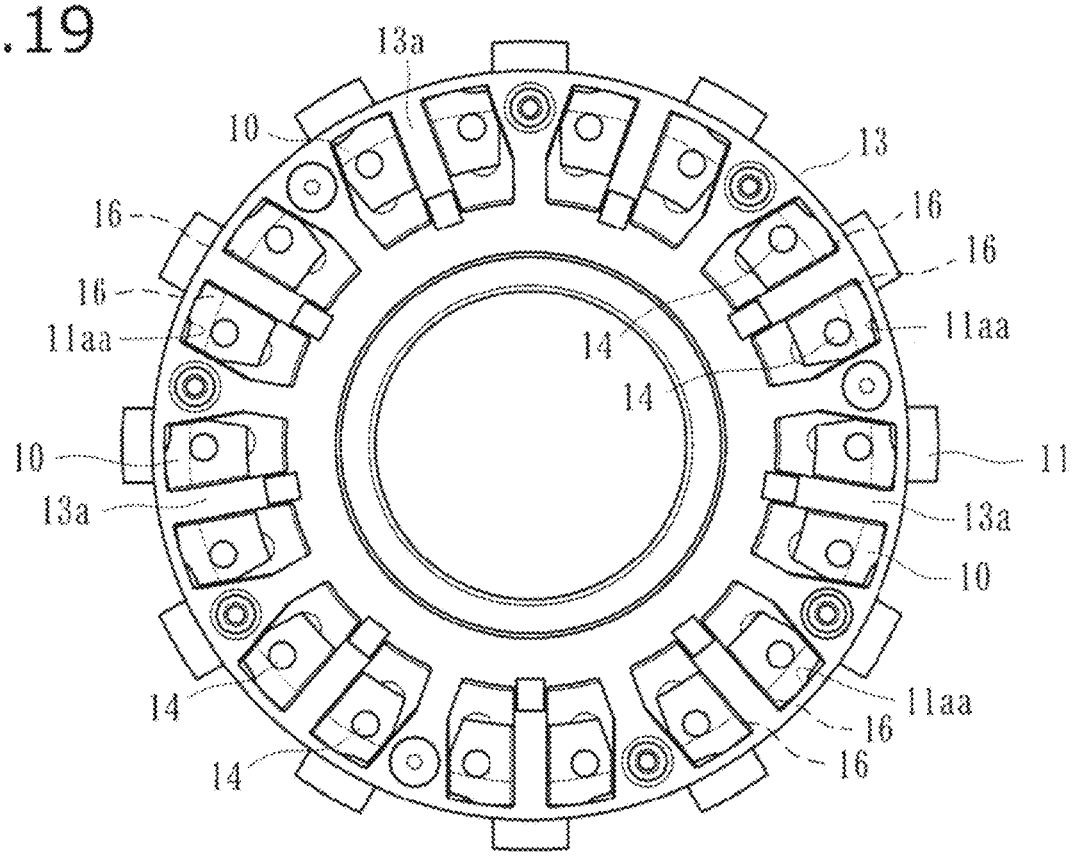
FIG. 19 is a plan view illustrating a state of the centrifugal clutch where each weight member is located at a radially outer position.

As illustrated in FIG. 16, each weight member 10 is a substantially symmetrical polygonal member including a first surface X and a second surface Y. As illustrated in FIGS. 16 and 17, each weight member 10 includes through holes 10a passing through the weight member 10 from the first surface X to the second surface Y, insertion portions 10b (apertures) defined in the second surface Y, and a groove 10c defined in the first surface X. As illustrated in FIGS. 18 and 19, the weight members 10 are each housed in an associated one of housing portions 11a of the holding member 11. When no centrifugal force is applied to the weight members 10, the weight members 10 are each held at the radially inner position (see FIG. 18). Application of centrifugal force to the weight members 10 moves the weight members 10 outward against the urging force of the urging members 16 such that each weight member 10 reaches the radially outer position (see FIG. 19).

Figure 13:
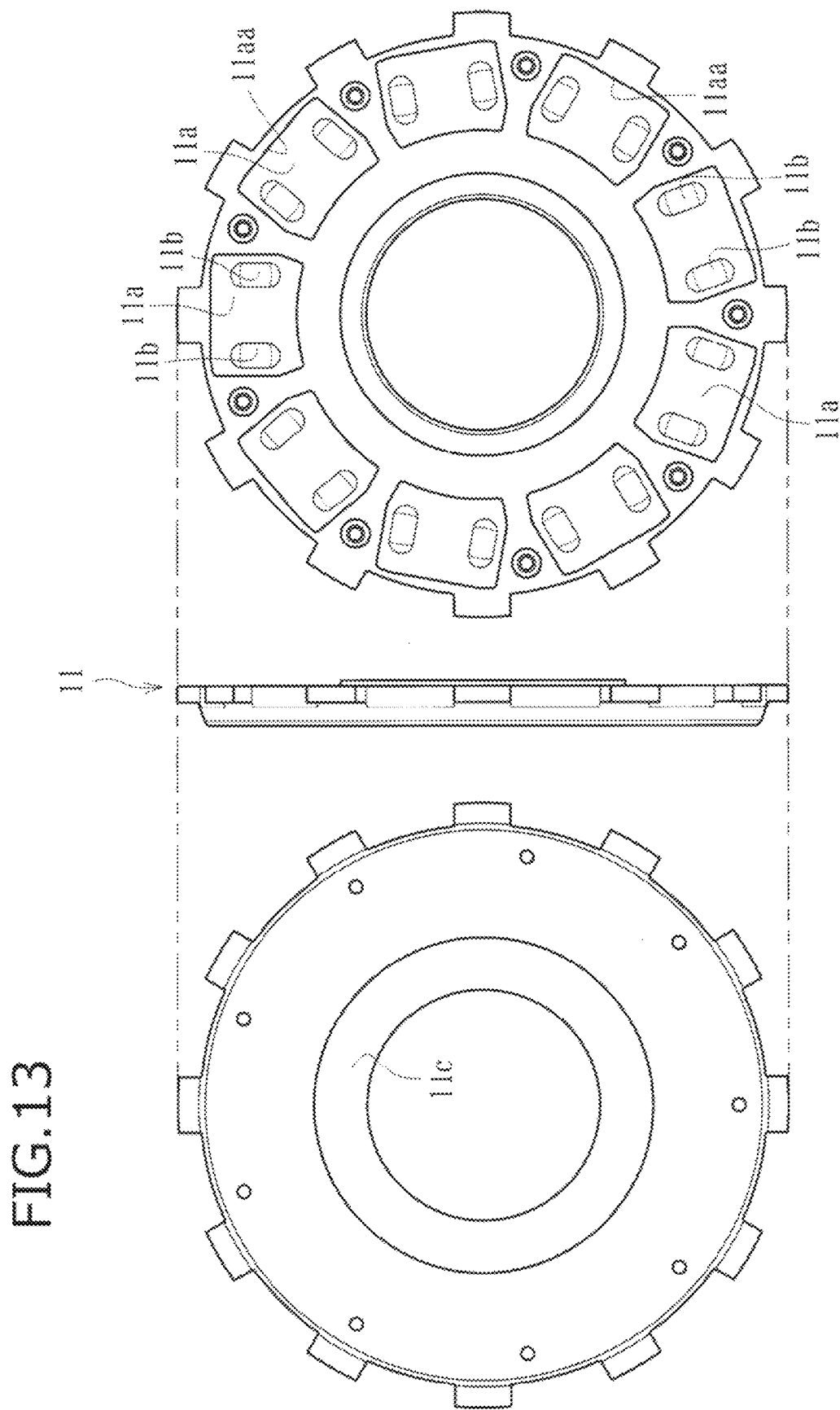
FIG. 13 is a three-view drawing of a holding member included in the centrifugal clutch.

The holding member 11 holds the weight members 10 such that each weight member 10 is movable between the radially inner position and the radially outer position. As illustrated in FIG. 13, the holding member 11 is an annular member. The holding member 11 includes the housing portions 11a which are arranged in the circumferential direction of the holding member 11 and in which the weight members 10 are to be housed, groove geometries 11b defined in the housing portions 11a, and a pushing surface 11c. Each housing portion 11a has a recessed shape conforming to the shape and moving range of the associated weight member 10. An inner peripheral wall surface 11aa of each housing portion 11a is allowed to abut against first ends of the associated urging members 16.

Figure 14:
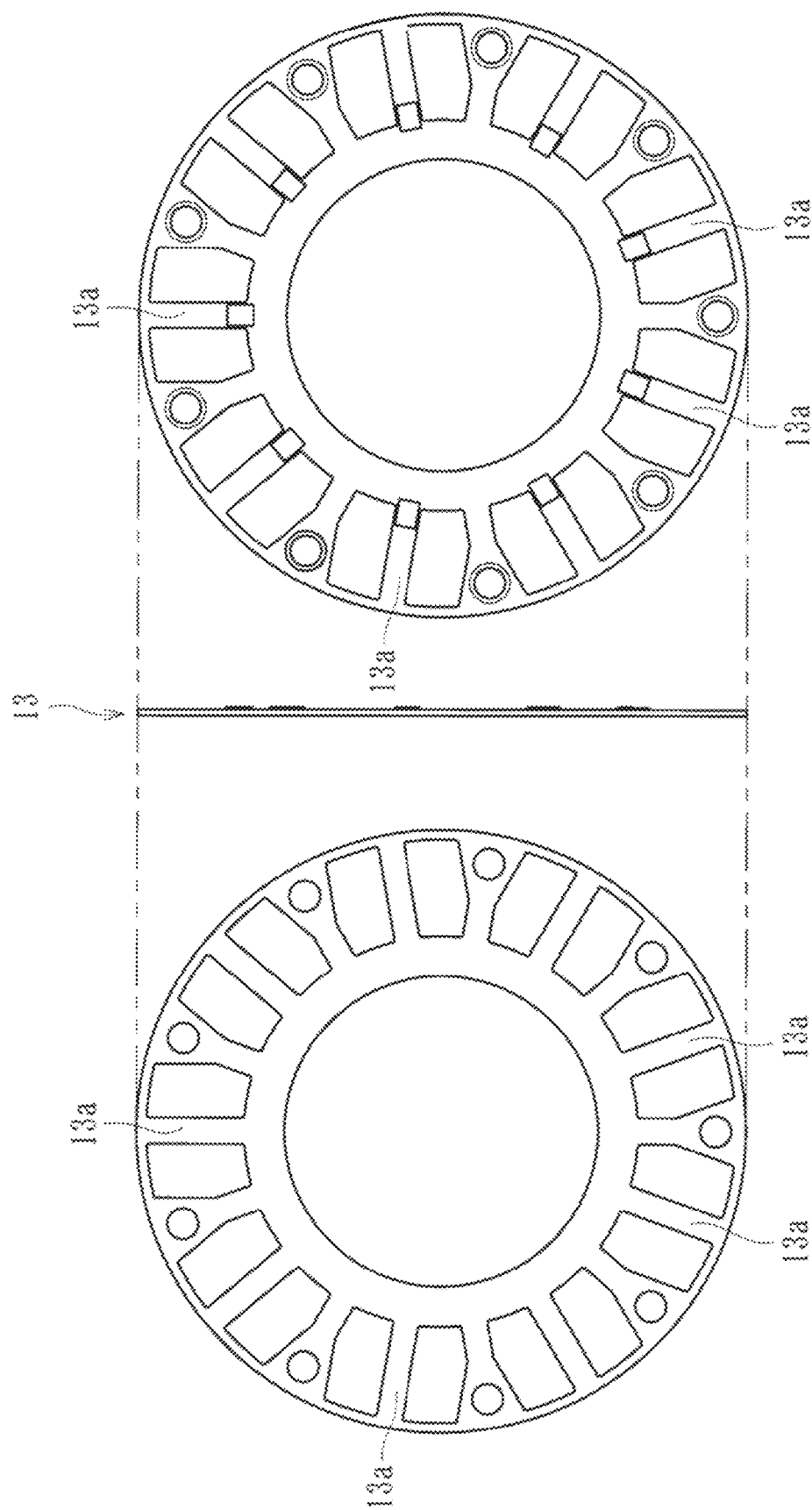
FIG. 14 is a three-view drawing of a supporting member included in the centrifugal clutch.

The supporting member 13 is secured to a surface of the holding member 11, which is provided with the housing portions 11a. As illustrated in FIG. 14, the supporting member 13 is provided with radially extending holding portions 13a. The holding portions 13a each conform to the groove 10c of the associated weight member 10, so that the weight members 10 are held by the holding member 11. Specifically, the first surface X of each weight member 10 is centrally provided with the groove 10c extending in a direction from the radially inner position to the radially outer position. Causing each holding portion 13a to conform to the associated groove 10c allows the holding member 11 to hold the weight members 10 such that each weight member 10 is movable in a radial direction (i.e., in a direction from the radially inner position to the radially outer position).

Figure 15:
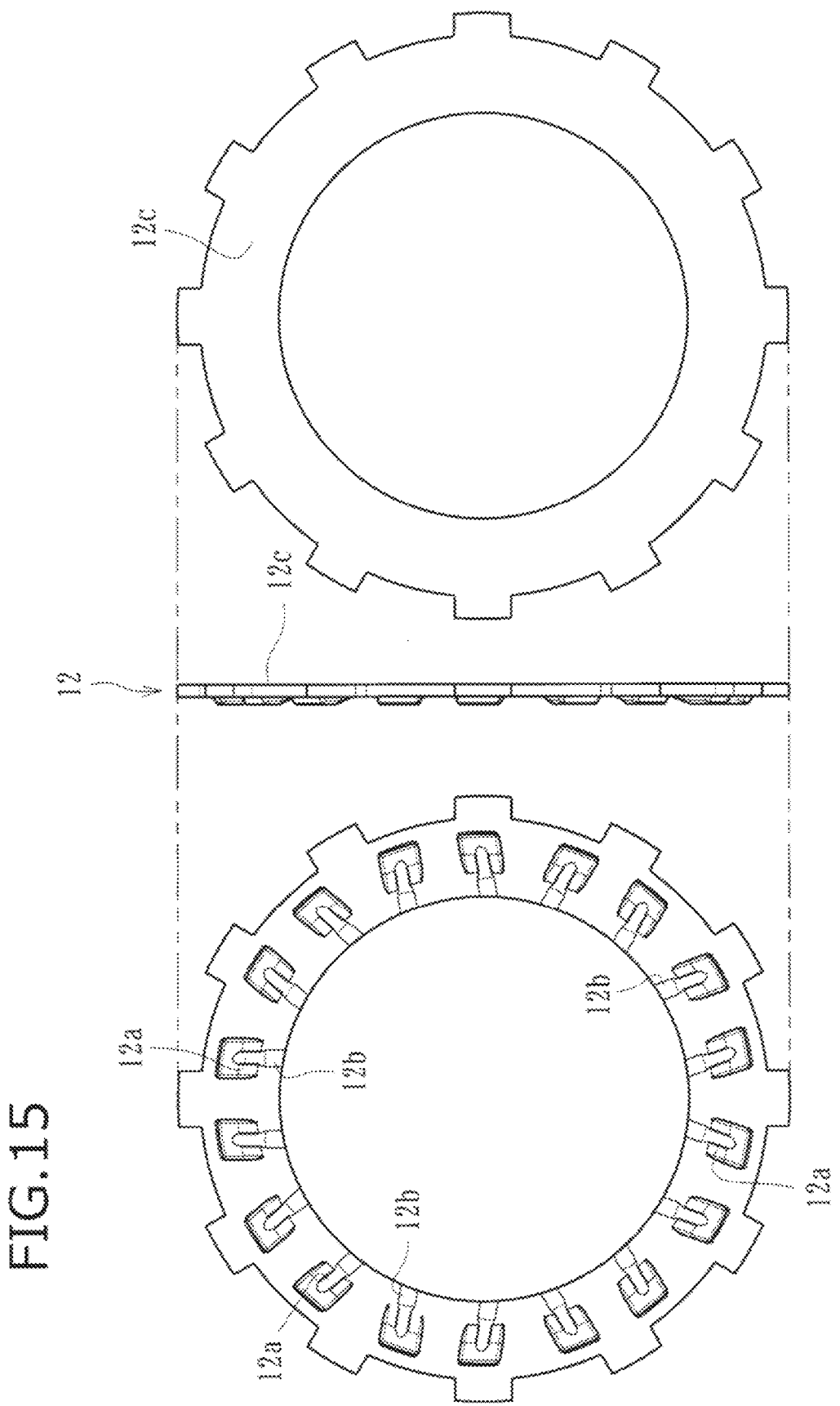
FIG. 15 is a three-view drawing of a pressing member included in the centrifugal clutch.

Movement of each weight member 10 from the radially inner position to the radially outer position causes the pressing member 12 to move in a stacking direction of the driving and driven clutch plates 6 and 7 (i.e., rightward in FIGS. 2 and 3) such that the driving and driven clutch plates 6 and 7 are pressed against each other. Specifically, as illustrated in FIG. 15, the pressing member 12 is an annular member. The pressing member 12 includes inclined grooves 12a arranged in the circumferential direction of the pressing member 12, groove geometries 12b each defined at a position where the associated inclined groove 12a is defined, and a pushing surface 12c.

Each inclined groove 12a is defined at a position corresponding to the position of the associated weight member 10. Each inclined groove 12a is inclined upward from its inner portion to its outer portion. Thus, when the clutch housing 2 is stationary, each weight member 10 is held at the radially inner position with the urging force of the associated urging members 16. Rotation of the clutch housing 2 applies centrifugal force to the weight members 10 so as to move the weight members 10 along the inclined grooves 12a inclined upward. This moves the pressing member 12 away from the holding member 11 (i.e., in the direction in which the driving and driven clutch plates 6 and 7 are to be pressed against each other).

Figure 11:
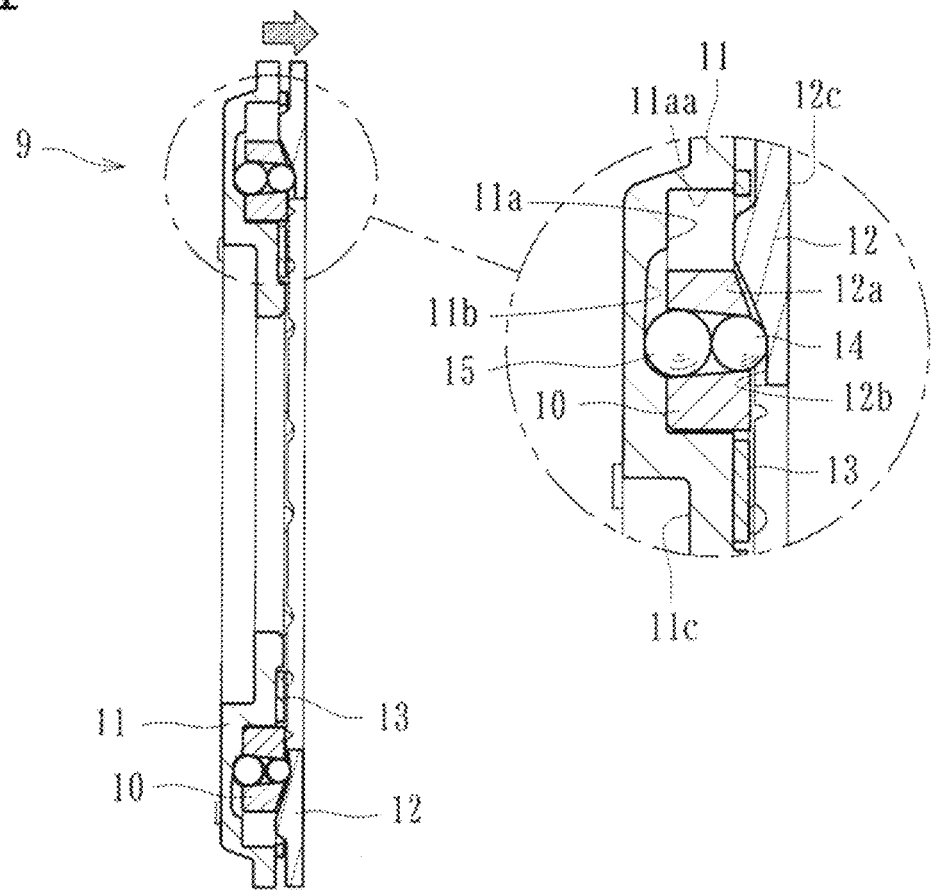
FIG. 11 is a longitudinal cross-sectional view of a centrifugal clutch of the power transmission apparatus.
Figure 12:
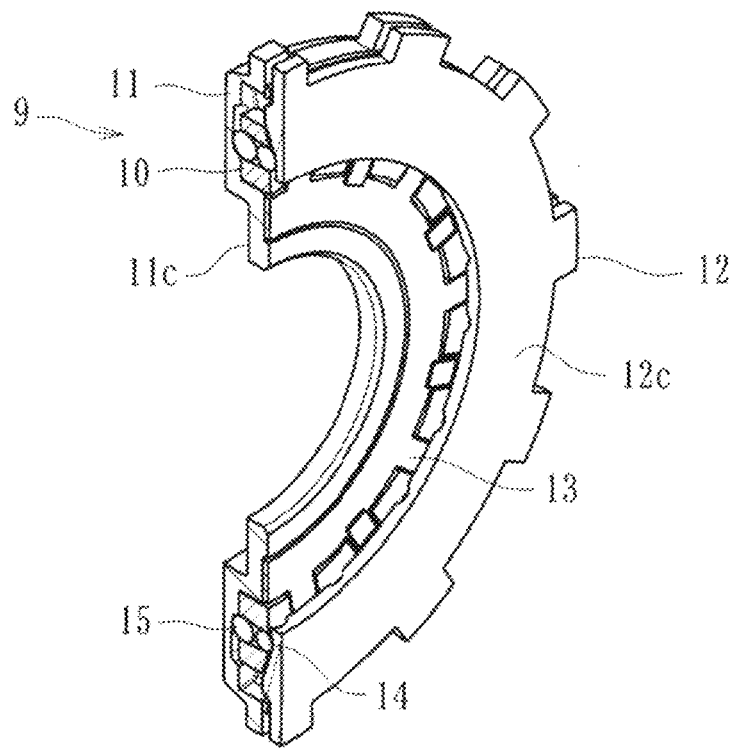
FIG. 12 is a partially cutaway perspective view of the centrifugal clutch.

When the holding member 11 and the pressing member 12 are assembled to each other, with the weight members 10 interposed therebetween, each inclined groove 12a is located at a position corresponding to the position of the associated weight member 10 as illustrated in FIGS. 11 and 12. With centrifugal force, the weight members 10 each move along the inclined grooves 12a from the radially inner position to the radially outer position, which moves the pressing member 12 in a direction indicated by the arrow in FIG. 11 (i.e., rightward in FIG. 11). The pushing surface 12c of the pressing member 12 thus pushes the driving and driven clutch plates 6 and 7 such that the driving and driven clutch plates 6 and 7 are pressed against each other. The resulting reaction force moves the holding member 11 in a direction opposite to the direction indicated by the arrow in FIG. 11 (i.e., leftward in FIG. 11), so that the pushing surface 11c of the holding member 11 presses the auxiliary clutch plate 17.

As illustrated in FIGS. 18 and 19, the weight members 10 according to the present preferred embodiment are each housed in an associated one of the housing portions 11a arranged in the circumferential direction of the holding member 11 such that the weight members 10 are movable radially. More than one urging member 16 (i.e., two urging members 16 in the present preferred embodiment) is disposed in the circumferential direction between the inner peripheral wall surface 11aa (see FIG. 13) of each of the housing portions 11a and an associated one of the weight members 10 so as to urge the associated weight member 10 from the radially outer position to the radially inner position. In this preferred embodiment, the inner peripheral wall surface 11aa of each housing portion 11a is a flat surface in abutment with the first ends of the associated urging members 16 such that the urging members 16 are stably securable.

The weight members 10 according to the present preferred embodiment are each provided with the tunnel-shaped insertion portions 10b which are openings defined in a surface of each weight member 10 facing the holding member 11 (i.e., the second surface Y in FIG. 17) and into which the urging members 16 are inserted such that the urging members 16 are attachable to the associated weight member 10. The weight members 10, with the urging members 16 inserted into the insertion portions 10b, are housed in the housing portions 11a of the holding member 11. The urging members 16 are thus secured such that each urging member 16 is interposed between the inner peripheral wall surface 11aa of the associated housing portion 11a and the associated weight member 10. The urging members 16 are disposed such that the first end of each urging member 16 is in abutment with the associated inner peripheral wall surface 11aa and a second end of each urging member 16 is in abutment with an end wall surface 10ba of the associated insertion portion 10b, making it possible to urge each weight member 10 from the radially outer position to the radially inner position.

Each first spherical member 14 is a steel ball attached to the associated weight member 10. As illustrated in FIGS. 16 and 17, each first spherical member 14 is partially protruded from a first opening 10aa (i.e., a small-diameter opening in the first surface X) of the through hole 10a defined in the associated weight member 10 and is in contact with a rolling contact surface of the pressing member 12 so as to be rollable thereon. Each second spherical member 15 is a steel ball attached to the associated weight member 10. As illustrated in FIGS. 16 and 17, each second spherical member 15 is partially protruded from a second opening 10ab (i.e., a large-diameter opening in the second surface Y) of the through hole 10a defined in the associated weight member 10 and is in contact with a rolling contact surface of the holding member 11 so as to be rollable thereon.

As illustrated in FIG. 17, the through holes 10a according to the present preferred embodiment are tapered such that the diameter of each through hole 10a continuously increases from the first opening 10aa (i.e., the small-diameter opening in the first surface X) to the second opening 10ab (i.e., the large-diameter opening in the second surface Y). Disconnection of each first spherical member 14 from the associated through hole 10a is prevented by the outer peripheral edge of one of the first opening 10aa and the second opening 10ab that has a smaller diameter (which is, in the present preferred embodiment, the first opening 10aa in the first surface X). The first and second spherical members 14 and 15 according to the present preferred embodiment are spherical members having different diameters in accordance with the inner diameters of the through holes 10a. The second spherical members 15 are larger in diameter than the first spherical members 14. The small-diameter first spherical members 14 are each rollable while being in contact with the inner peripheral surface of the associated through hole 10a, and at the same time, disconnection of the small-diameter first spherical members 14 is prevented by the small-diameter opening edges of the through holes 10a.

As illustrated in FIGS. 11 and 12, disconnection of the second spherical members 15 is prevented by the rolling contact surface of the holding member 11. Thus, disconnection of the small-diameter first spherical members 14 is prevented by the small-diameter opening edges of the through holes 10a, and disconnection of the large-diameter second spherical members 15 is prevented by the rolling contact surface of the holding member 11 while the second spherical members 15 are partially protruded from the large-diameter openings of the through holes 10a. In the present preferred embodiment, the large-diameter second spherical members 15 are assembled to the weight members 10 such that the second spherical members 15 face the rolling contact surface of the holding member 11. Alternatively, the second spherical members 15 may be assembled to the weight members 10 such that the second spherical members 15 face the rolling contact surface of the pressing member 12. In this case, disconnection of the small-diameter first spherical members 14 is prevented by the small-diameter opening edges of the through holes 10a, and disconnection of the large-diameter second spherical members 15 is prevented by the rolling contact surface of the pressing member 12 while the second spherical members 15 are partially protruded from the large-diameter openings of the through holes 10a.

As illustrated in FIG. 13, the rolling contact surface of the holding member 11 (which is, in the present preferred embodiment, a surface of the holding member 11 on which the second spherical members 15 roll) includes the groove geometries 11b each extending in the direction of movement of the associated weight member 10 (i.e., a direction connecting the radially inner position to the radially outer position). As illustrated in FIG. 15, the rolling contact surface of the pressing member 12 (which is, in the present preferred embodiment, a surface of the pressing member 12 on which the first spherical members 14 roll) includes the groove geometries 12b each extending in the direction of movement of the associated weight member 10 (i.e., a direction connecting the radially inner position to the radially outer position).

As illustrated in FIGS. 16, 18, and 19, the first and second spherical members 14 and 15 according to the present preferred embodiment are provided such that more than one first spherical member 14 and more than one second spherical member 15 are arranged in the circumferential direction of the holding member 11 (i.e., such that two first spherical members 14 and two second spherical members 15 are arranged in the width direction of each weight member 10 in the present preferred embodiment). In response to movement of the weight members 10, the first spherical members 14 are movable along the groove geometries 12*b* while rolling within the through holes 10*a*, and the second spherical members 15 are movable along the groove geometries 11*b* while rolling within the through holes 10*a*.

The auxiliary clutch plate 17 is an annular member different in diameter from the driving and driven clutch plates 6 and 7 (i.e., smaller in diameter than the driving and driven clutch plates 6 and 7 in the present preferred embodiment). As illustrated in FIGS. 2 and 3, the output shaft 3 (i.e., the output) is inserted through a central opening 17*a* of the auxiliary clutch plate 17 so as to be fitted thereto. The auxiliary clutch plate 17 includes a pushed surface 17*b* facing the pushing surface 11*c* of the holding member 11.

When the weight members 10 are each located at the radially outer position (i.e., when the driving and driven clutch plates 6 and 7 are pressed against each other), the auxiliary clutch plate 17 is able to transmit the driving force of the engine E to the output shaft 3 upon being pushed by the pushing surface 11*c* of the holding member 11 and pressed against the pushing surface 11*c*. When the weight members 10 are each located at the radially inner position (i.e., when the pressing force exerted on the driving and driven clutch plates 6 and 7 is released), the auxiliary clutch plate 17 is able to cut off transmission of the driving force of the engine E to the output shaft 3 upon being relieved of a pressing force applied thereto, owing to a decrease in pushing force exerted by the pushing surface 11*c* of the holding member 11.

Upon movement of each weight member 10 to the radially outer position, each inclined groove 12*a* functions as a cam so as to cause the holding member 11 and the pressing member 12 to move away from each other. Accordingly, the pushing surface 12*c* of the pressing member 12 presses the driving and driven clutch plates 6 and 7 against each other, and the pushing surface 11*c* of the holding member 11 pushes the pushed surface 17*b* of the auxiliary clutch plate 17 such that the pushed surface 17*b* is pressed against the pushing surface 11*c* so as to transmit the driving force of the engine E to the driving wheel T.

As illustrated in FIGS. 5 and 6, a portion of a surface of the first clutch member 4*a* according to the present preferred embodiment, which faces the pressure member 5, defines an abutment surface 4*ad*. As illustrated in FIGS. 9 and 10, a portion of a surface of the pressure member 5, which faces the first clutch member 4*a*, defines an abutment surface 5*e*. With the first clutch member 4*a*, the second clutch member 4*b*, and the pressure member 5 assembled to each other (and with no torque being transmitted from the input gear 1 (i.e., the input) to the output shaft 3 (i.e., the output)), the abutment surface 4*ad* and the abutment surface 5*e* are in abutment with each other as illustrated in FIGS. 2 and 3.

Figure 22:
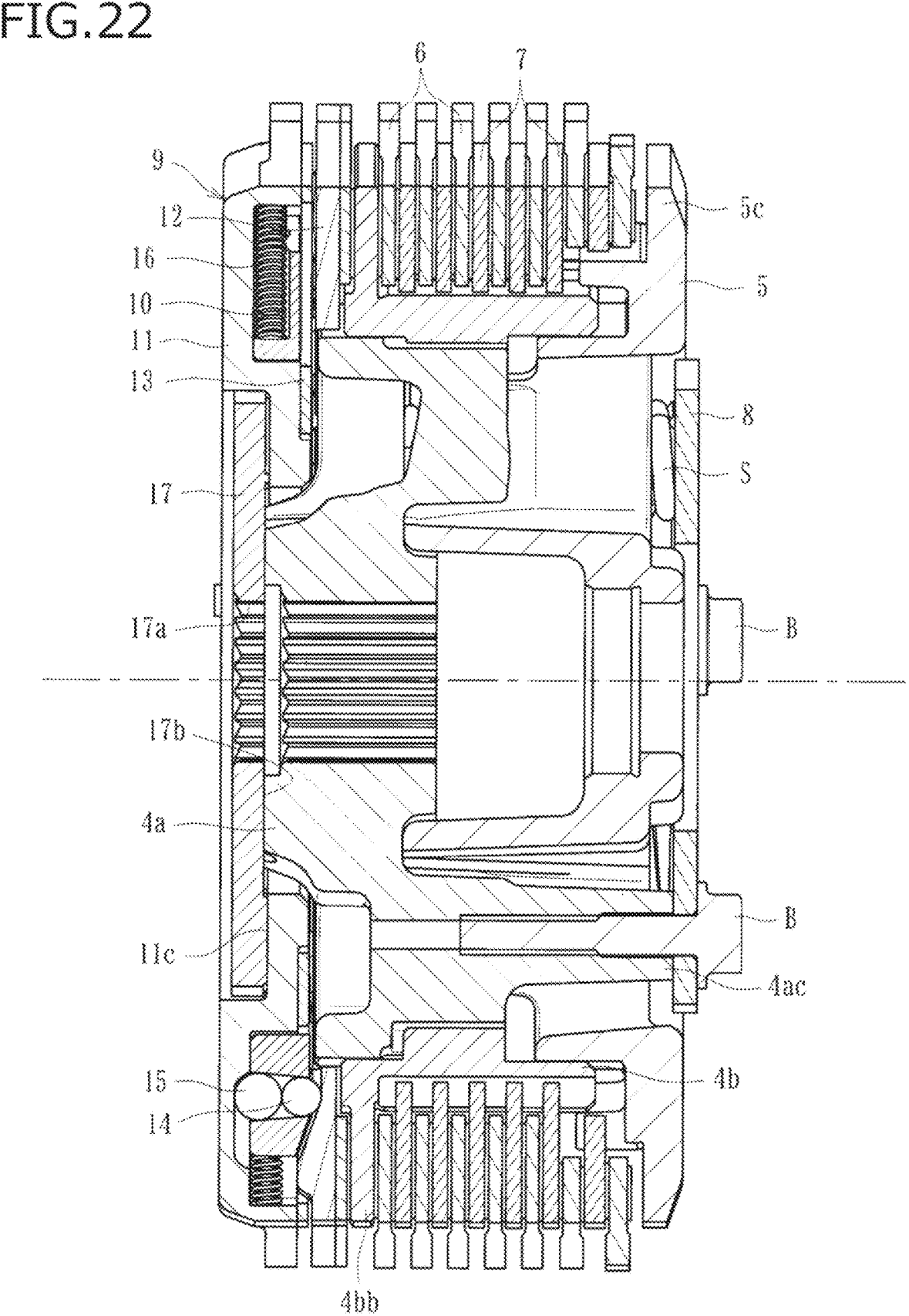
FIG. 22 is a cross-sectional view illustrating a state of the power transmission apparatus where each weight member is located at the radially inner position.
Figure 23:
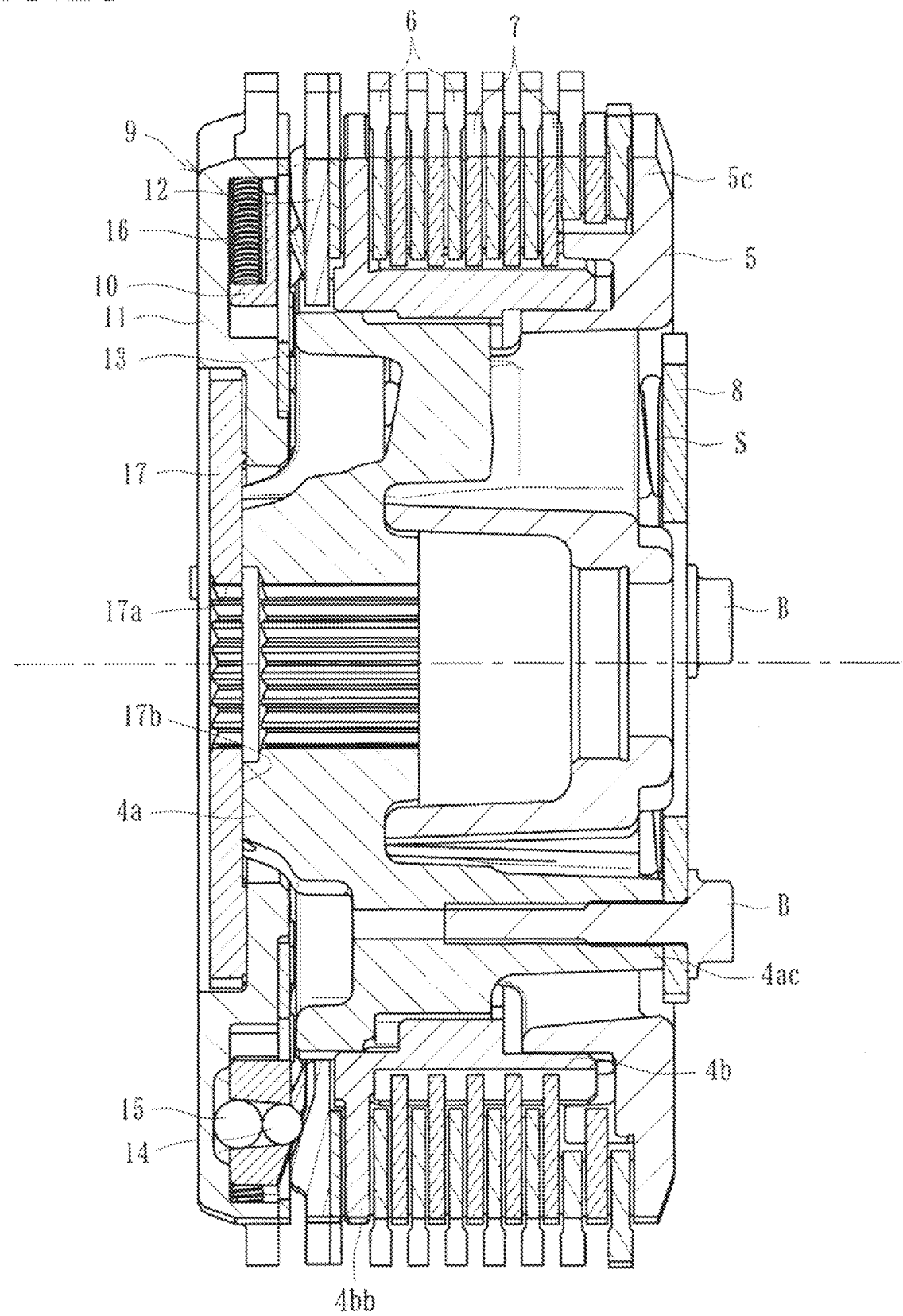
FIG. 23 is a cross-sectional view illustrating a state of the power transmission apparatus where each weight member is located at an intermediate position between the radially inner position and the radially outer position.

With the abutment surface 4*ad* and the abutment surface 5*e* in abutment with each other as mentioned above, in the course of movement of each weight member 10 of the centrifugal clutch 9 from the radially inner position (see FIG. 22) to an intermediate position (see FIG. 23) and a resulting increase in torque transmitted from the input gear 1 (i.e., the input) to the output shaft 3 (i.e., the output), the first clutch member 4*a* and the pressure member 5 are not allowed to move relative to each other, which restricts operation of the pressing assist cams.

Figure 24:
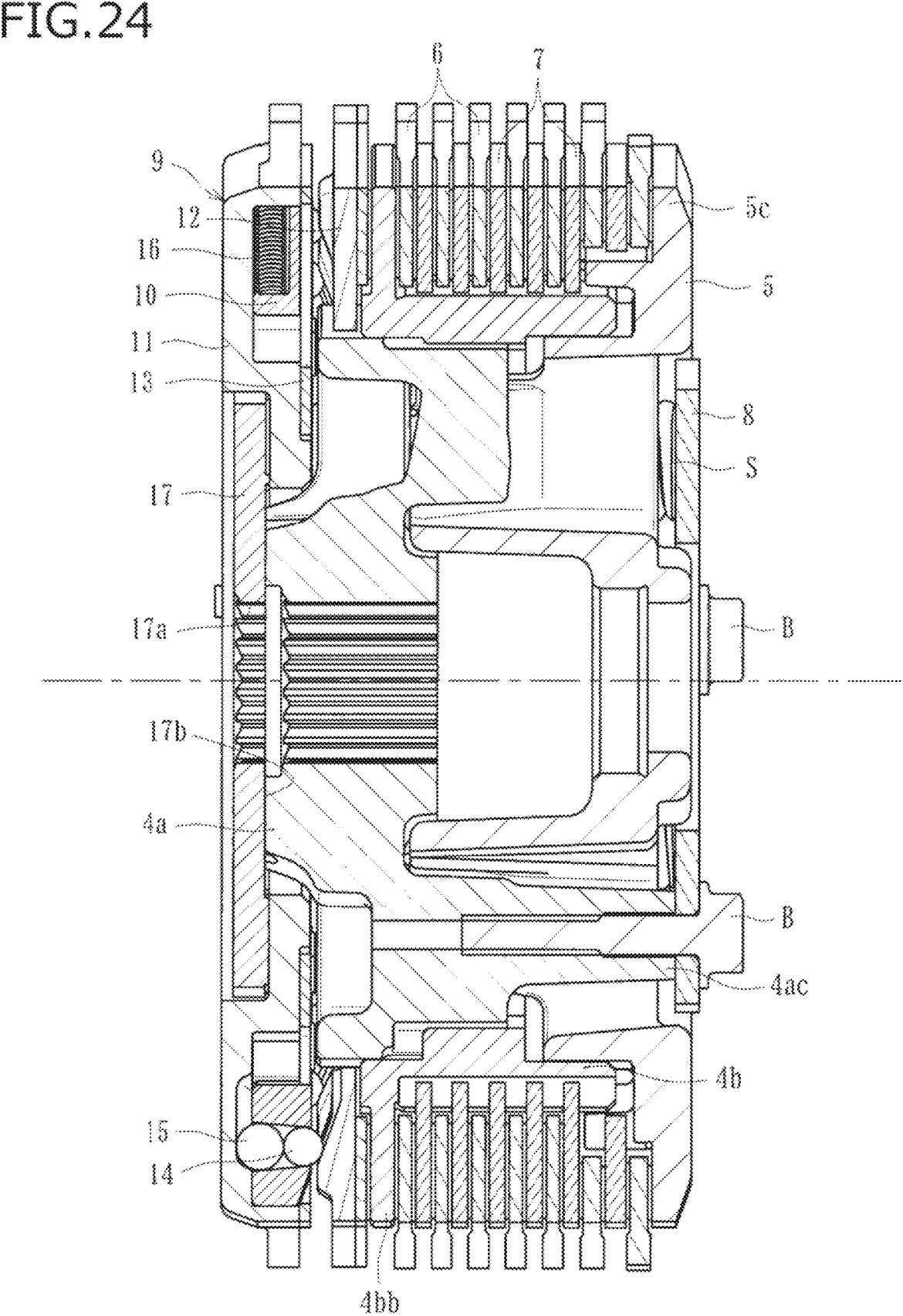
FIG. 24 is a cross-sectional view illustrating a state of the power transmission apparatus where each weight member is located at the radially outer position.
Figure 25:
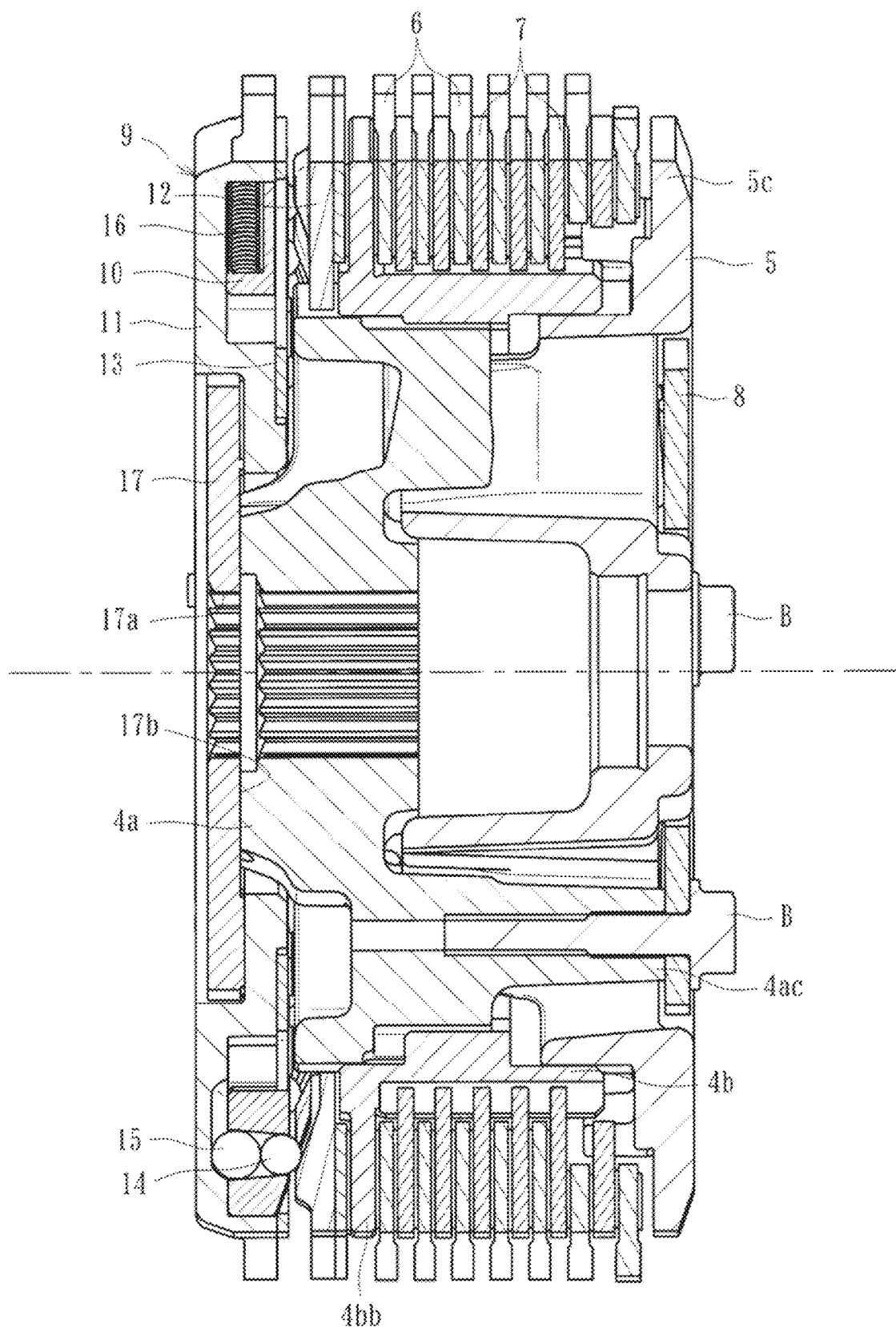
FIG. 25 is a cross-sectional view illustrating a state of the power transmission apparatus where each weight member is located at the radially outer position and the pressure member is located at a non-operating position.

Each weight member 10 of the centrifugal clutch 9 then further moves from the intermediate position (see FIG. 23) to the radially outer position (see FIG. 24), and the driving and driven clutch plates 6 and 7 are pushed by the flange 4*bb* of the second clutch member 4*b* and thus pressed against each other. When the pushing force of the flange 4*bb* is equal to or greater than the urging force of the clutch springs S, the second clutch member 4*b* and the pressure member 5 are moved in the axial direction (i.e., rightward in FIGS. 2 and 3) relative to the first clutch member 4*a*, so that the abutment surface 4*ad* of the first clutch member 4*a* and the abutment surface 5*e* of the pressure member 5 are spaced away from each other. FIG. 25 illustrates a state in which the weight members 10 are each located at the radially outer position and the pressure member 5 is located at the non-operating position (i.e., a clutch-disengaged state).

With the abutment surface 4*ad* and the abutment surface 5*e* spaced away from each other as mentioned above, in the course of movement of each weight member 10 of the centrifugal clutch 9 from the radially inner position to the radially outer position and a resulting increase in torque transmitted from the input gear 1 (i.e., the input) to the output shaft 3 (i.e., the output), the first clutch member 4*a* and the pressure member 5 are allowed to move relative to each other, which allows operation of the pressing assist cams.

In the power transmission apparatus K according to the present preferred embodiment, the through holes 10*a* of the weight members 10 included in the centrifugal clutch 9 each have a tapered shape from the first opening 10*aa* to the second opening 10*ab*. Disconnection of each first spherical member 14 is prevented by the outer peripheral edge of one of the associated first opening 10*aa* and the associated second opening 10*ab* that has a smaller diameter. Accordingly, the present preferred embodiment is able to easily and accurately attach the first spherical members 14 to the weight members 10, resulting in a reduction in manufacturing cost.

The first and second spherical members 14 and 15 are spherical members having different diameters in accordance with the inner diameters of the through holes 10*a*. The first and second spherical members 14 and 15 are rollable while being in contact with the inner peripheral surfaces of the through holes 10*a*. Thus, during movement of the weight members 10, the first and second spherical members 14 and 15 are rollable in a stable manner such that the weight members 10 move smoothly. Disconnection of the second spherical members 15 according to the present preferred embodiment is prevented by the rolling contact surface of the holding member 11 or the pressing member 12. Consequently, the present preferred embodiment is able to facilitate preventing disconnection of the first and second spherical members 14 and 15.

The rolling contact surface of the holding member 11 or the pressing member 12 includes the groove geometries (11*b*, 12*b*) extending in the direction of movement of the weight members 10. Accordingly, the present preferred embodiment enables smoother movement of the weight members 10 while reliably preventing disconnection of the second spherical members 15 from the large-diameter openings and disconnection of the first spherical members 14 from the small-diameter openings.

In addition, the weight members 10 according to the present preferred embodiment are each housed in an associated one of the housing portions 11*a* arranged in the circumferential direction of the holding member 11 such that the weight members 10 are movable radially. More than one urging member 16 is disposed in the circumferential direction between the inner peripheral wall surface 11*aa* of each of the housing portions 11*a* and an associated one of the weight members 10 so as to urge the associated weight member 10 from the radially outer position to the radially inner position. Accordingly, the present preferred embodiment is able to accurately urge each weight member 10 from the radially outer position to the radially inner position, enabling stable movement of the weight members 10 in accordance with centrifugal force.

The weight members 10 according to the present preferred embodiment are each provided with the insertion portions 10b which are openings defined in the surface of each weight member 10 facing the holding member 11 and into which the urging members 16 are inserted such that the urging members 16 are attachable to the associated weight member 10. This facilitates assembling the urging members 16 to the weight members 10. The weight members 10 according to the present preferred embodiment are each provided with the groove 10c extending in a direction from the radially inner position to the radially outer position. The holding member 11 (or specifically, the supporting member 13 secured to the holding member 11 so as to be integral therewith) is provided with the holding portions 13a each conforming to the associated groove 10c and holding the associated weight member 10. Accordingly, the present preferred embodiment enables stable movement of the weight members 10.

The centrifugal clutch 9 according to the present preferred embodiment includes the first spherical members 14 that are partially protruded from the first openings 10aa of the through holes 10a defined in the weight members 10 and are in contact with the rolling contact surface (or the groove geometries 12b) of the pressing member 12 so as to be rollable thereon, and the second spherical members 15 that are partially protruded from the second openings 10ab of the through holes 10a defined in the weight members 10 and are in contact with the rolling contact surface (or the groove geometries 11b) of the holding member 11 so as to be rollable thereon. Accordingly, the present preferred embodiment enables more stable movement of the weight members 10.

The holding member 11 or the pressing member 12, in particular, includes the groove geometries (11b, 12b) extending in the direction of movement of the weight members 10. The groove geometries (11b, 12b) define the rolling contact surface for the first spherical members 14 or the second spherical members 15 so as to enable smoother movement of the weight members 10. The first and second spherical members 14 and 15 according to the present preferred embodiment are provided such that more than one first spherical member 14 and more than one second spherical member 15 are arranged in the circumferential direction of the holding member 11 (i.e., the width direction of each weight member 10). Accordingly, the present preferred embodiment enables more stable movement of the weight members 10.

Although the present preferred embodiment has been described thus far, the present invention is not limited to this preferred embodiment. In one example, the apparatus may include no pressing assist cam (which includes the inclined surfaces 4aa and 5a) or no back torque limiter cam (which includes the inclined surfaces 4ab and 5b). In another example, the apparatus may include no auxiliary clutch plate 17. In the present preferred embodiment, the through holes 10a each have a tapered shape. Alternatively, the through holes 10a may each be an insertion hole having a constant diameter from its first opening to its second opening, and disconnection of the first and second spherical members 14 and 15 may be prevented by any other disconnection preventing structures and methods, such as swaging.

In the present preferred embodiment, with the first clutch member 4a, the second clutch member 4b, and the pressure member 5 assembled to each other (and with no torque being transmitted from the input gear 1 (i.e., the input) to the output shaft 3 (i.e., the output)), the abutment surface 4ad and the abutment surface 5e are in abutment with each other. Alternatively, the first clutch member 4a may include no abutment surface 4ad, the pressure member 5 may include no abutment surface 5e, and the first clutch member 4a and the pressure member 5 may be spaced away from each other. The power transmission apparatuses according to preferred embodiments of the present invention may find applications as various multiple-plate clutch type power transmission apparatuses for, for example, motorcycles, automobiles, three-wheel or four-wheel buggies, or general purpose machines.

A power transmission apparatus includes a centrifugal clutch including a holder holding masses such that the masses are each movable between a radially inner position and a radially outer position, a press to press driving and driven clutch plates against each other by moving in a stacking direction of the driving and driven clutch plates in response to movement of the masses from the radially inner position to the radially outer position, and springs to urge the masses from the radially outer position to the radially inner position. The masses are each housed in an associated one of housing portions arranged in a circumferential direction of the holder such that the masses are movable radially. More than one spring is located in the circumferential direction between an inner peripheral wall surface of each of the housing portions and an associated one of the masses so as to urge the associated mass from the radially outer position to the radially inner position. Such a power transmission apparatus may find applications involving, for example, change(s) in external shape or addition of other function(s).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A power transmission apparatus comprising:
a clutch housed in a clutch housing that rotates together with an input that rotates due to a driving force of an engine of a vehicle, the clutch housing having a plurality of driving clutch plates attached thereto, the clutch having a plurality of driven clutch plates attached thereto, the driven clutch plates being alternately arranged with the driving clutch plates, the clutch being connected to an output that is able to rotate a wheel of the vehicle;
a pressure applicator movable between an operating position where the driving and driven clutch plates are pressed against each other so as to enable transmission of the driving force of the engine to the wheel and a non-operating position where a pressing force exerted on the driving and driven clutch plates is released so as to cut off transmission of the driving force of the engine to the wheel; and
a centrifugal clutch including a mass movable from a radially inner position to a radially outer position due to centrifugal force produced by rotation of the clutch housing, the centrifugal clutch being configured to, when the mass is located at the radially outer position, press the driving and driven clutch plates against each other so as to enable transmission of the driving force of the engine to the wheel and configured to, when the mass is located at the radially inner position, release the pressing force exerted on the driving and driven clutch plates so as to cut off transmission of the driving force of the engine to the wheel; wherein the centrifugal clutch includes:
- a holder including a housing portion to house the mass such that the mass is movable between the radially inner position and the radially outer position; and
- a spring to urge the mass from the radially outer position to the radially inner position;

a surface of the mass facing the holder is provided with an aperture open toward the holder in an axial direction of the output and open in a direction perpendicular to the axial direction of the output; and the spring is located in the aperture.

2. The power transmission apparatus according to claim 1, wherein
the centrifugal clutch includes a support secured to the holder;
the mass includes a groove extending in a direction from the radially inner position to the radially outer position; and
the support is provided with a holding portion conforming to the groove and holding the mass.

3. The power transmission apparatus according to claim 1, wherein the centrifugal clutch includes:
- a press to press the driving and driven clutch plates against each other by moving in a stacking direction of the driving and driven clutch plates in response to movement of the mass from the radially inner position to the radially outer position;
- a first spherical body that is partially protruded from a first opening of a through hole defined in the mass and is in contact with a rolling contact surface of the press so as to be rollable thereon; and
- a second spherical body that is partially protruded from a second opening of the through hole defined in the mass and is in contact with a rolling contact surface of the holder so as to be rollable thereon.

4. The power transmission apparatus according to claim 3, wherein
the holder or the press includes a groove geometry extending in a direction of movement of the mass; and
the groove geometry defines a rolling contact surface for the first spherical body or the second spherical body.

5. The power transmission apparatus according to claim 3, wherein the first spherical body includes a plurality of first spherical bodies arranged in a circumferential direction of the holder, and the second spherical body includes a plurality of second spherical bodies arranged in the circumferential direction of the holder.

6. The power transmission apparatus according to claim 5, wherein the aperture of the mass is between the second spherical bodies arranged in the circumferential direction of the holder.

7. The power transmission apparatus according to claim 5, wherein the aperture of the mass includes a plurality of apertures.

8. A power transmission apparatus comprising:
a clutch housed in a clutch housing that rotates together with an input that rotates due to a driving force of an engine of a vehicle, the clutch housing having a plurality of driving clutch plates attached thereto, the clutch having a plurality of driven clutch plates attached thereto, the driven clutch plates being arranged alternately with the driving clutch plates, the clutch being connected to an output that is able to rotate a wheel of the vehicle;

a pressure applicator movable between an operating position where the driving and driven clutch plates are pressed against each other so as to enable transmission of the driving force of the engine to the wheel and a non-operating position where a pressing force exerted on the driving and driven clutch plates is released so as to cut off transmission of the driving force of the engine to the wheel; and a centrifugal clutch including a mass movable from a radially inner position to a radially outer position due to centrifugal force produced by rotation of the clutch housing, the centrifugal clutch being configured to, when the mass is located at the radially outer position, press the driving and driven clutch plates against each other so as to enable transmission of the driving force of the engine to the wheel and configured to, when the mass is located at the radially inner position, release the pressing force exerted on the driving and driven clutch plates so as to cut off transmission of the driving force of the engine to the wheel; wherein the centrifugal clutch includes:
- a holder holding the mass such that the mass is movable between the radially inner position and the radially outer position;
- a spring to urge the mass from the radially outer position to the radially inner position; and
- spherical bodies partially protruded from openings of a plurality of holes located in a surface of the mass located on one side in an axial direction of the output and being arranged in a circumferential direction of the output, the spherical bodies being in contact with a rolling contact surface of the holder so as to be rollable thereon; and
- a portion of the mass located between the holes includes an insertion portion in which the spring is housed.

9. A power transmission apparatus comprising:
a clutch housed in a clutch housing that rotates together with an input that rotates due to a driving force of an engine of a vehicle, the clutch housing having a plurality of driving clutch plates attached thereto, the clutch having a plurality of driven clutch plates attached thereto, the driven clutch plates being arranged alternately with the driving clutch plates, the clutch being connected to an output that is able to rotate a wheel of the vehicle;

a pressure applicator movable between an operating position where the driving and driven clutch plates are pressed against each other so as to enable transmission of the driving force of the engine to the wheel and a non-operating position where a pressing force exerted on the driving and driven clutch plates is released so as to cut off transmission of the driving force of the engine to the wheel; and a centrifugal clutch including a mass movable from a radially inner position to a radially outer position with centrifugal force produced by rotation of the clutch housing, the centrifugal clutch being configured to, when the mass is located at the radially outer position, press the driving and driven clutch plates against each other so as to enable transmission of the driving force of the engine to the wheel and configured to, when the mass is located at the radially inner position, release the pressing force exerted on the driving and driven clutch plates so as to cut off transmission of the driving force of the engine to the wheel; wherein the centrifugal clutch includes:
- a press to press the driving and driven clutch plates against each other by moving in a stacking direction of the driving and driven clutch plates in response to movement of the mass from the radially inner position to the radially outer position;
- a spring to urge the mass from the radially outer position to the radially inner position; and
- spherical bodies partially protruded from openings of a plurality of holes located in a surface of the mass located on one side in an axial direction of the output and being arranged in a circumferential direction of the output, the spherical bodies being in contact with a rolling contact surface of the press so as to be rollable thereon; and
- a portion of the mass located between the holes includes an insertion portion in which the spring is housed.

\* \* \* \* \*